Jan. 7, 1936.  G. O. FROSTAD  2,026,780
METHOD OF AND APPARATUS FOR PERFORMING
MECHANICAL OPERATIONS ON MOVING WORK
Filed April 9, 1931   12 Sheets-Sheet 1
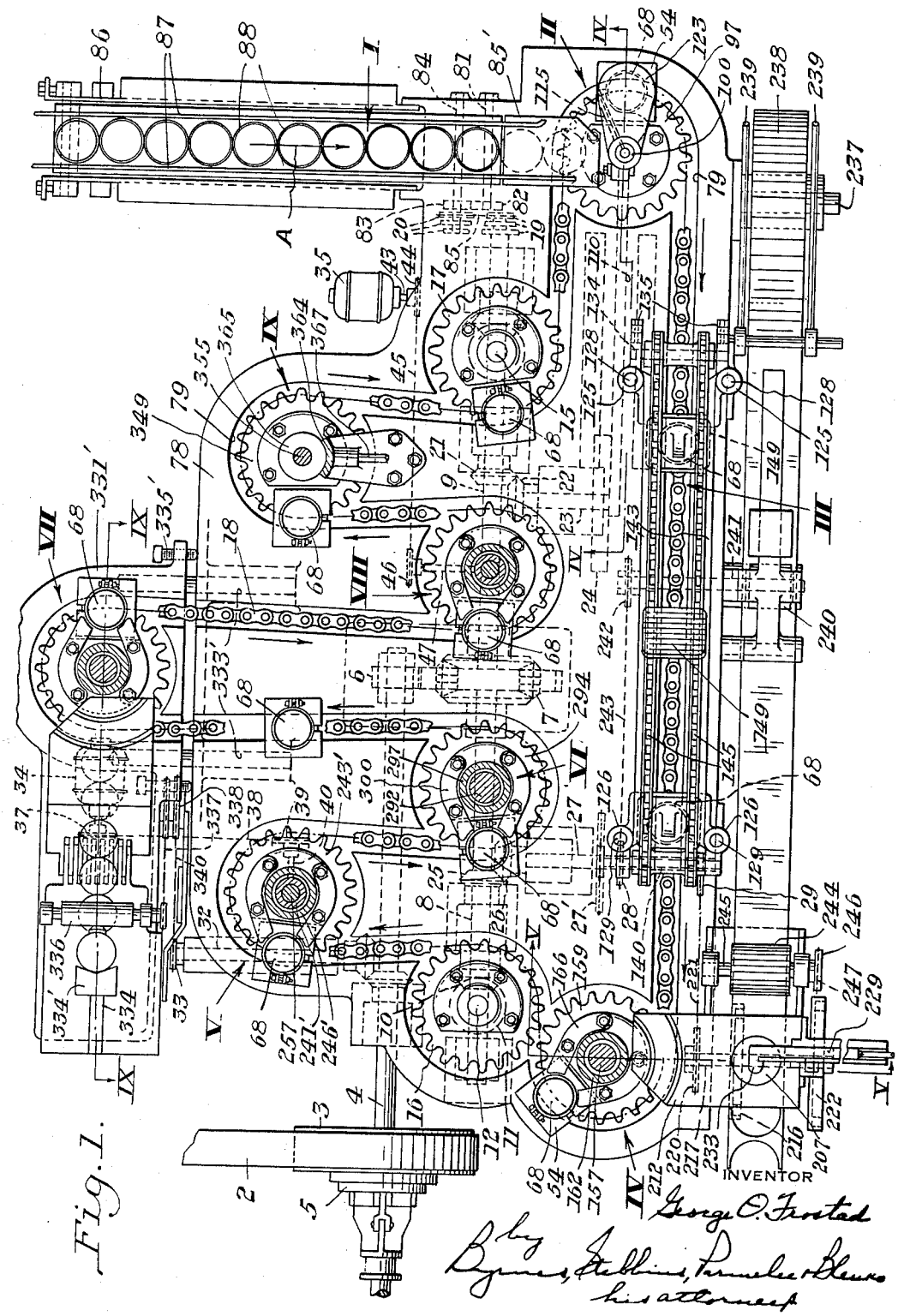
INVENTOR
George O. Frostad

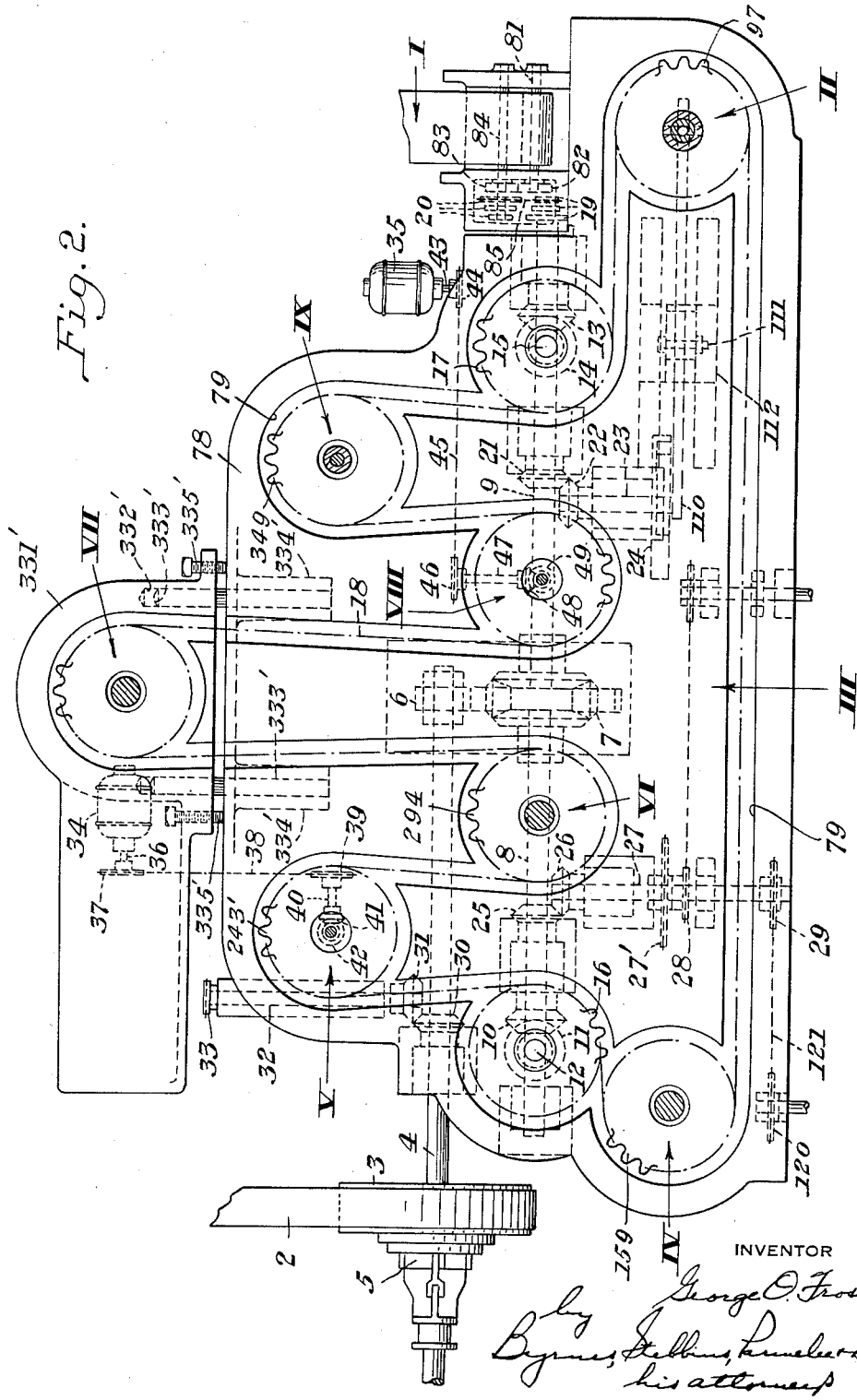

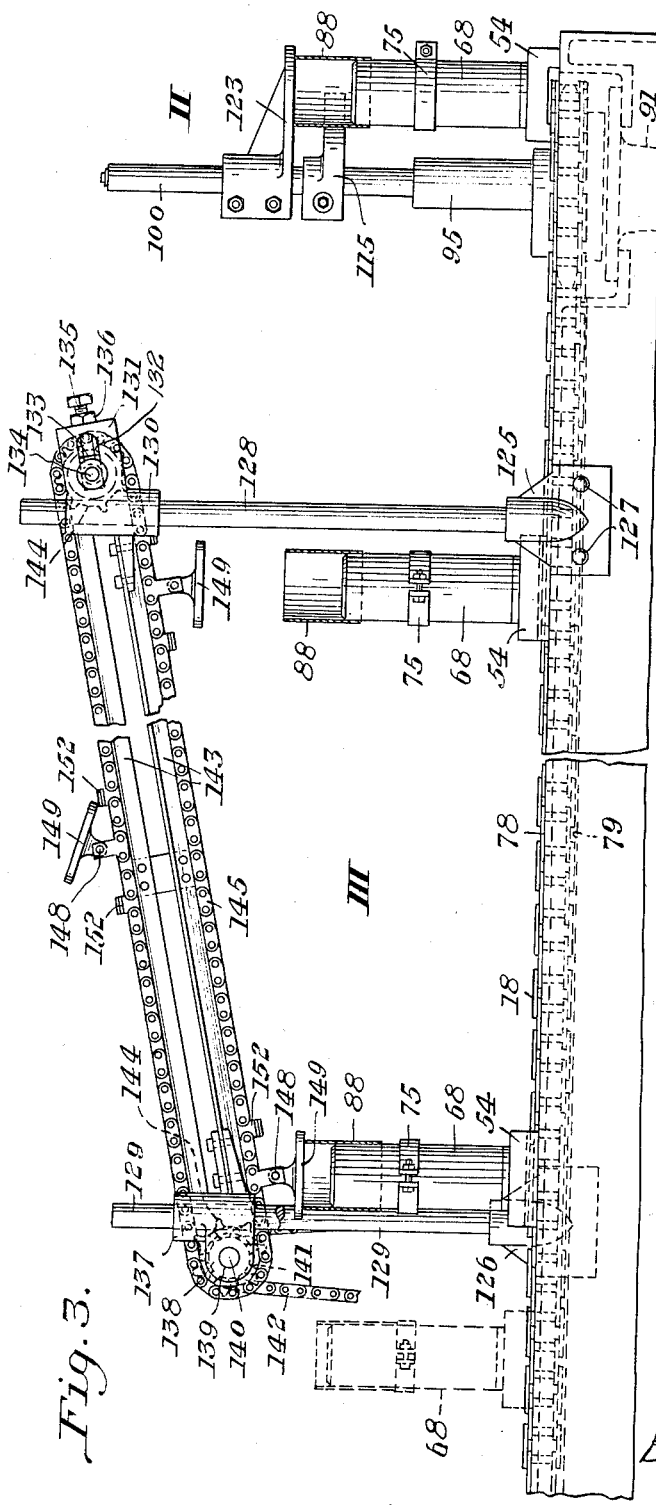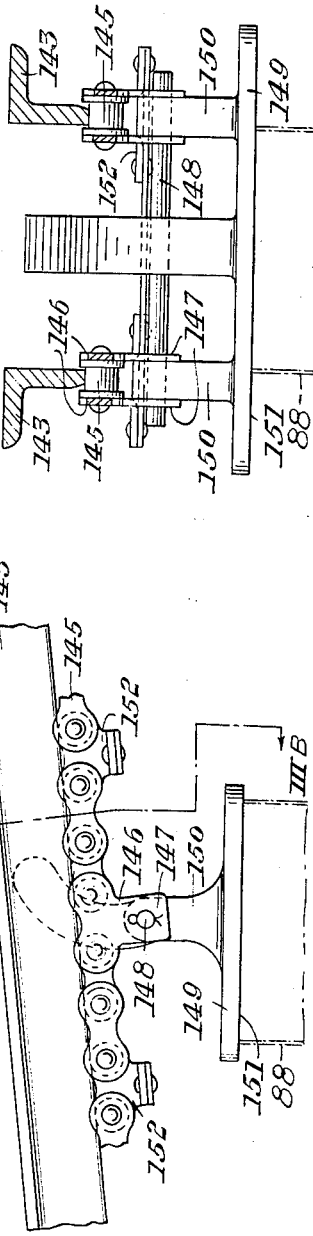

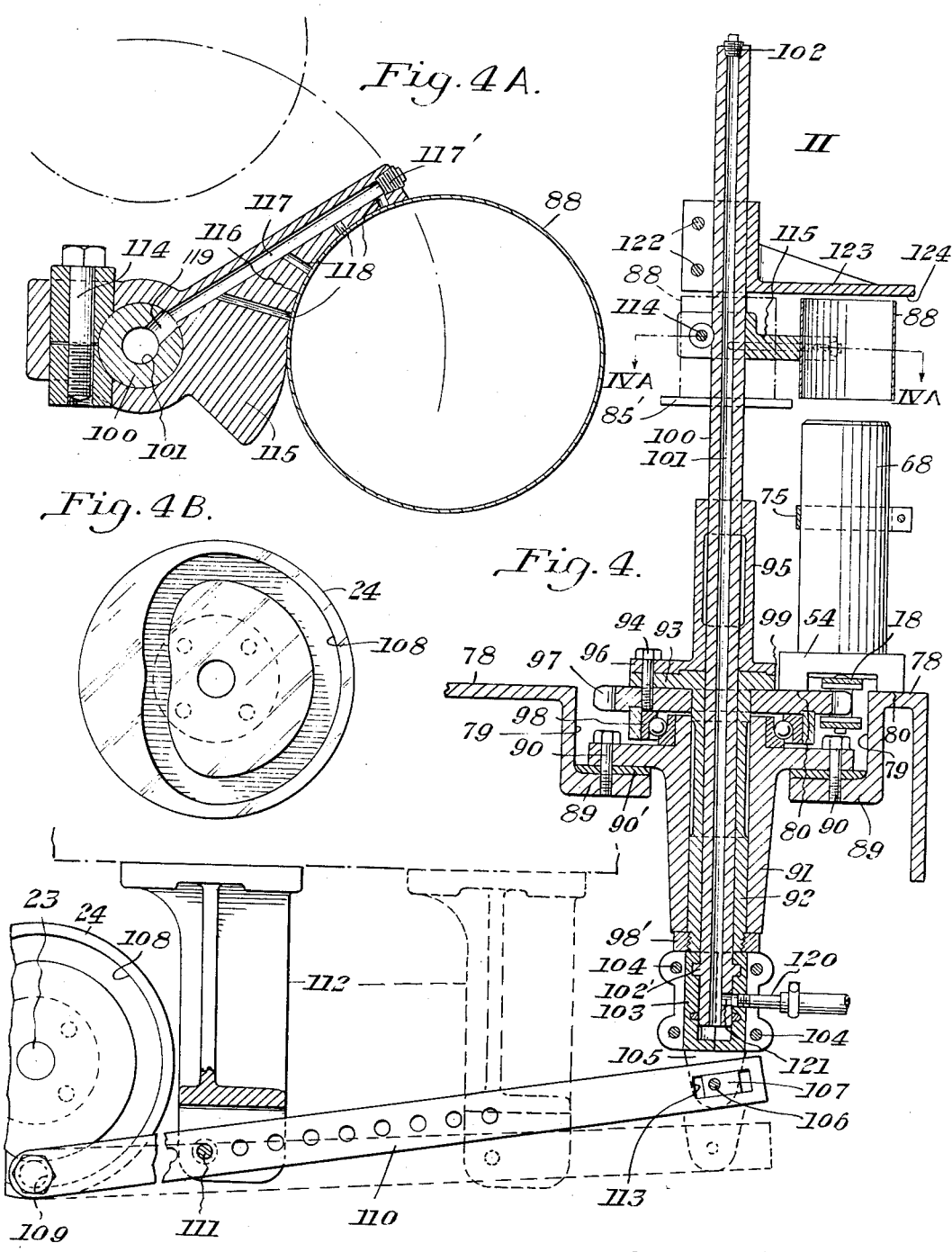

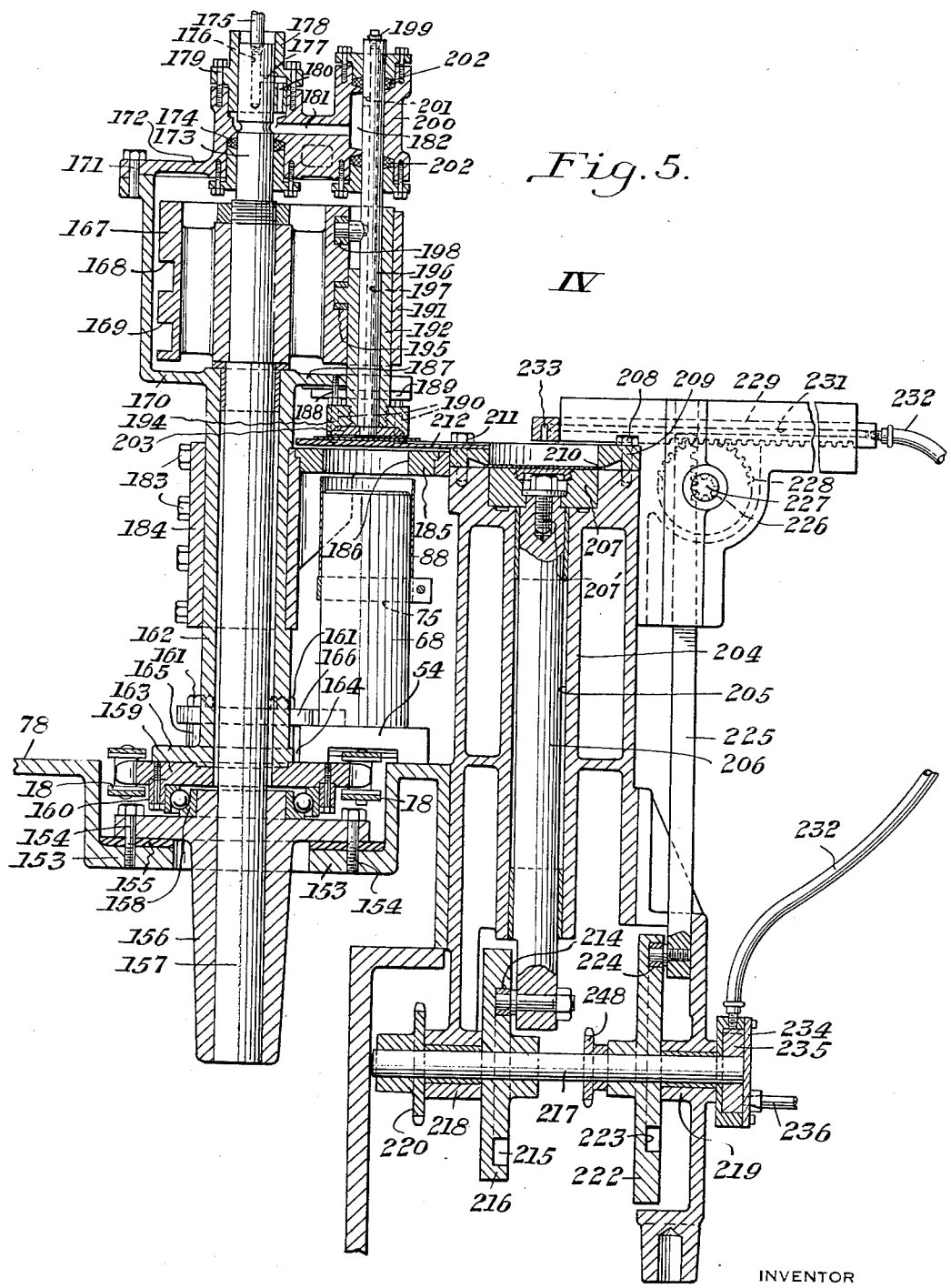

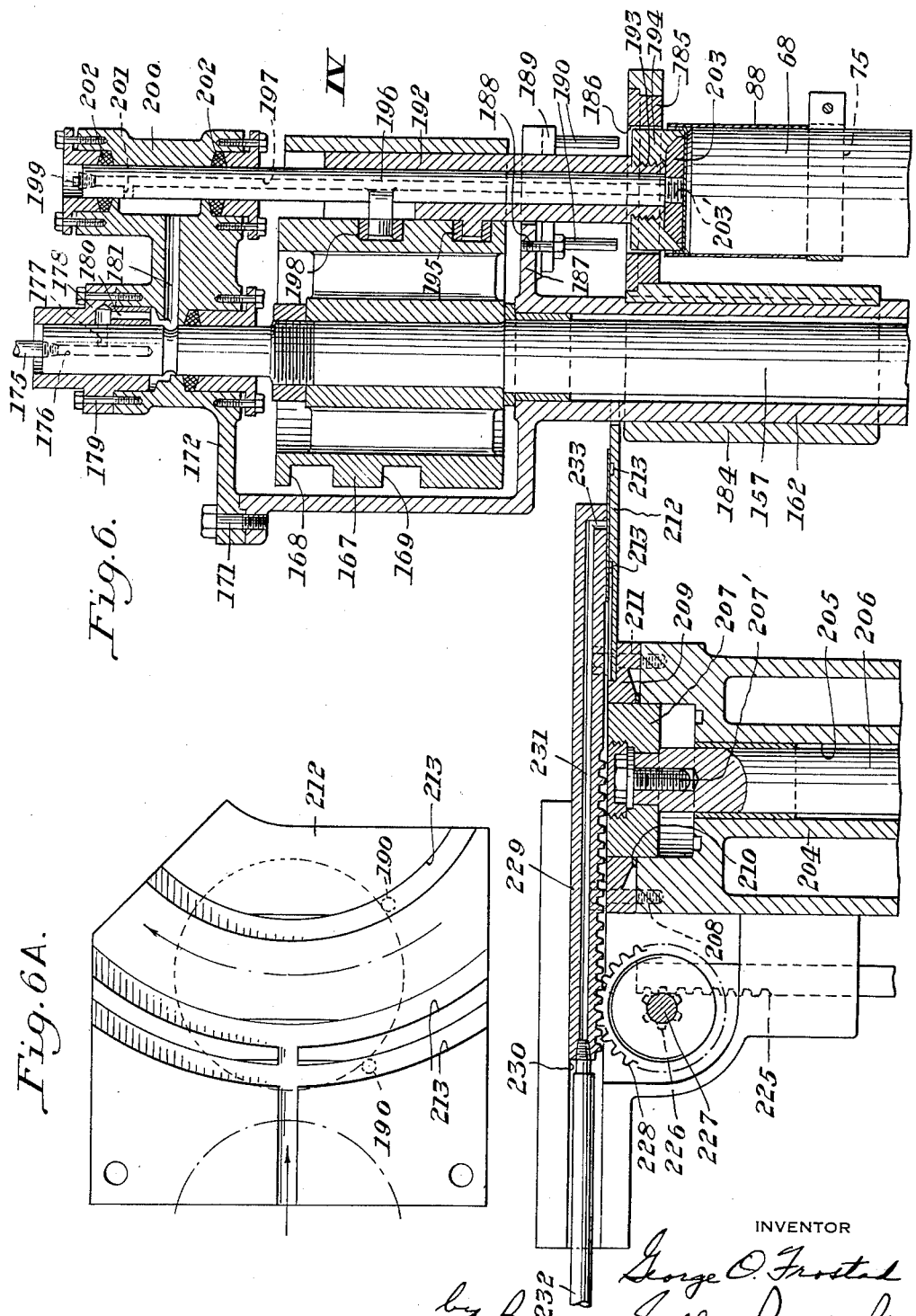

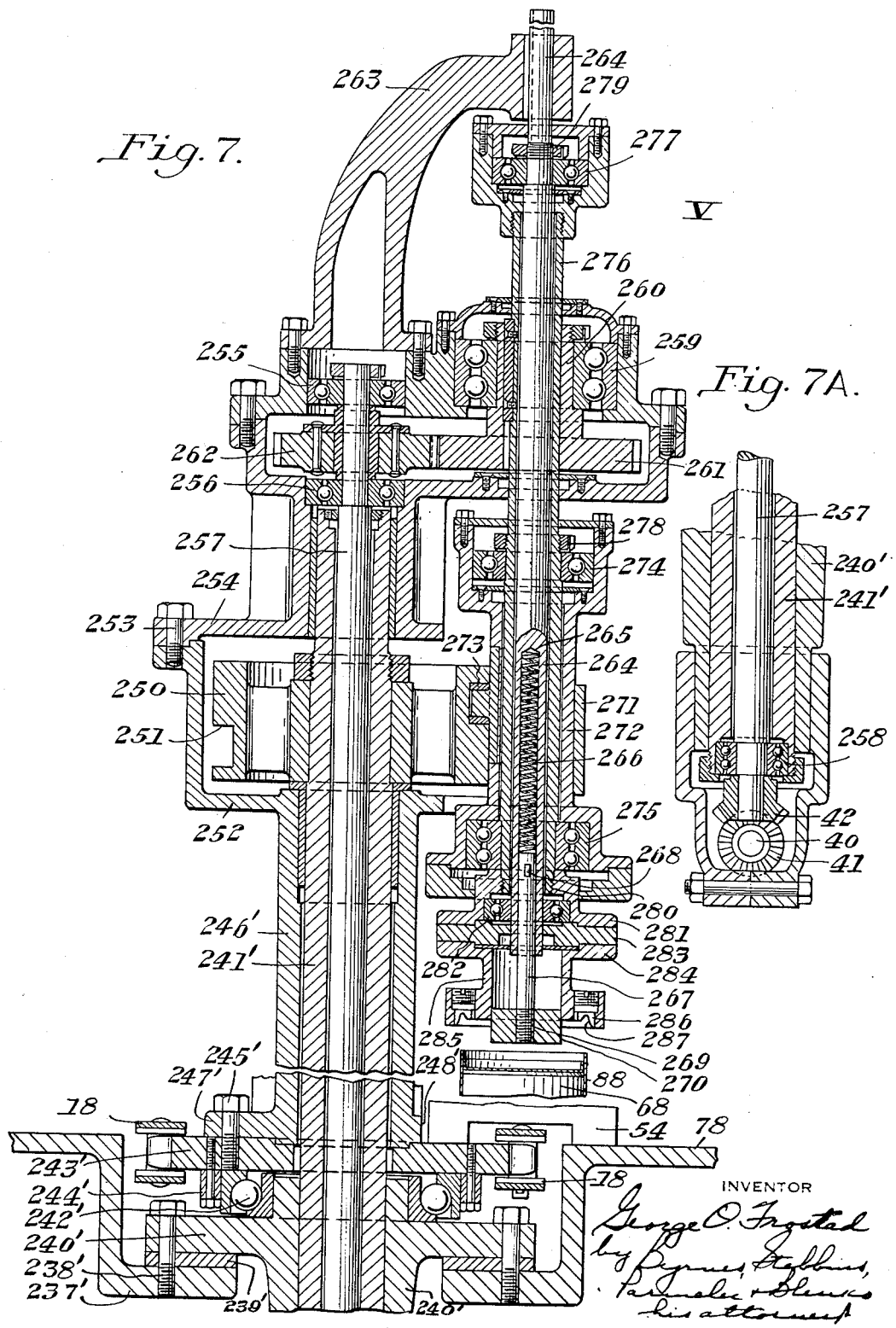

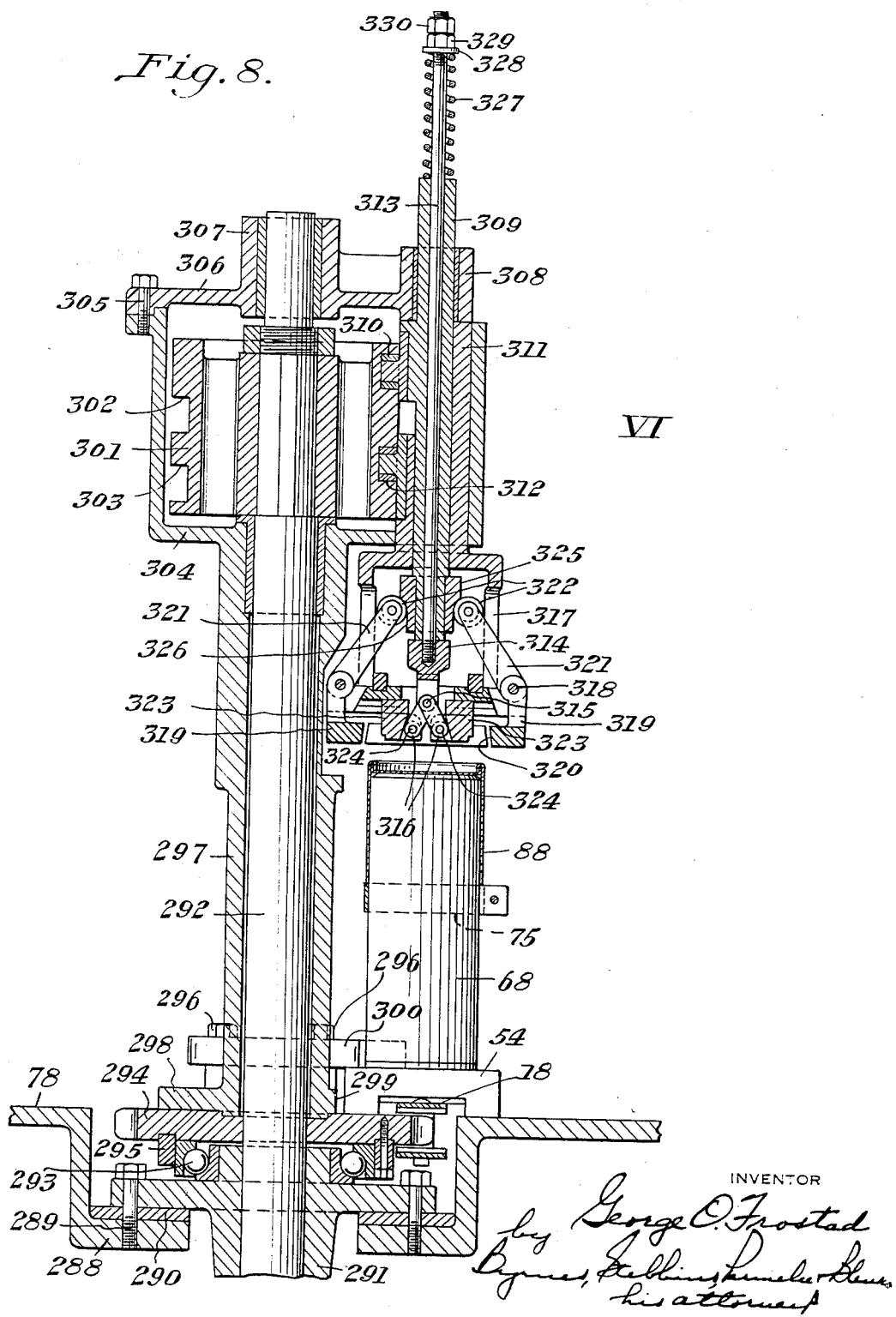

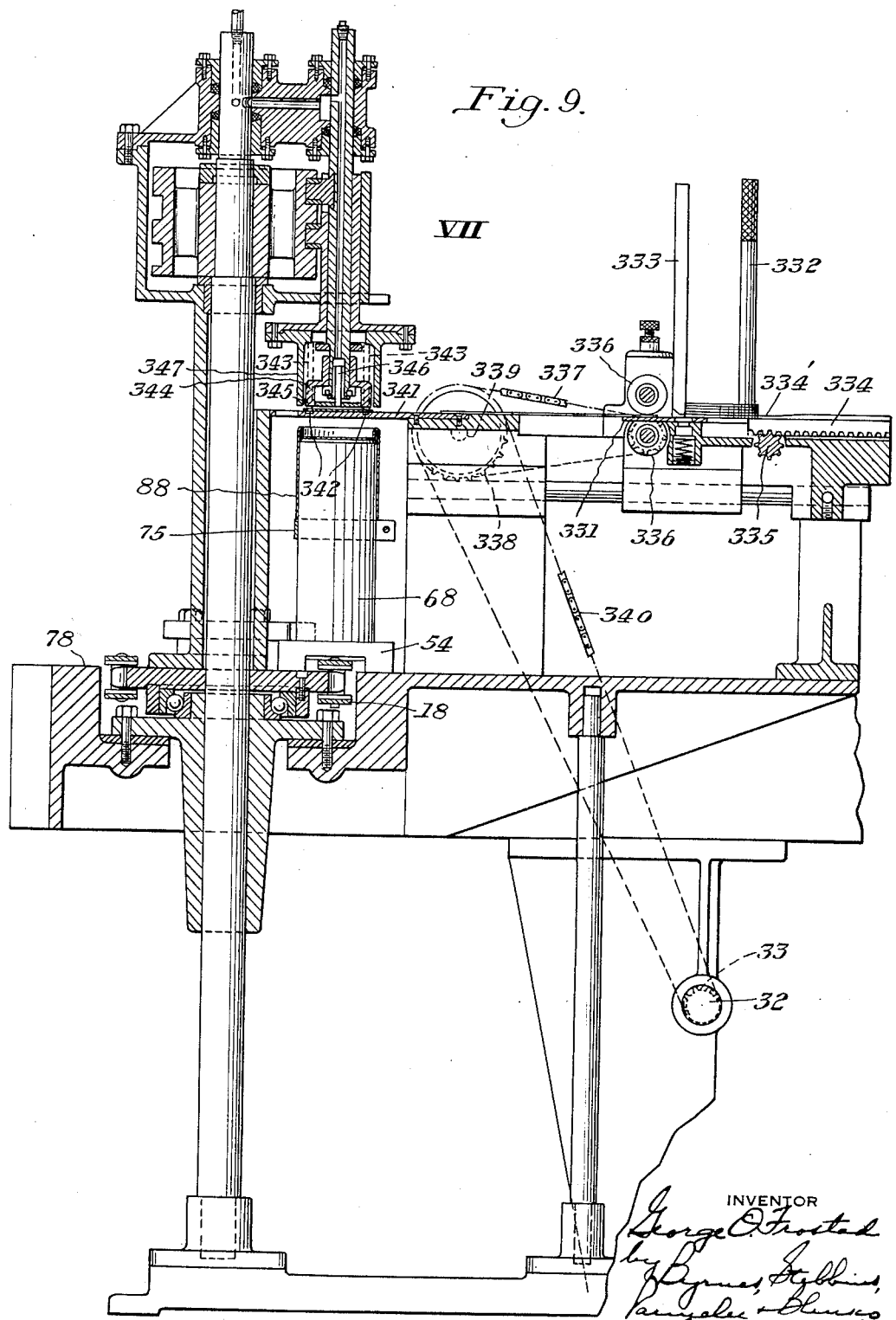

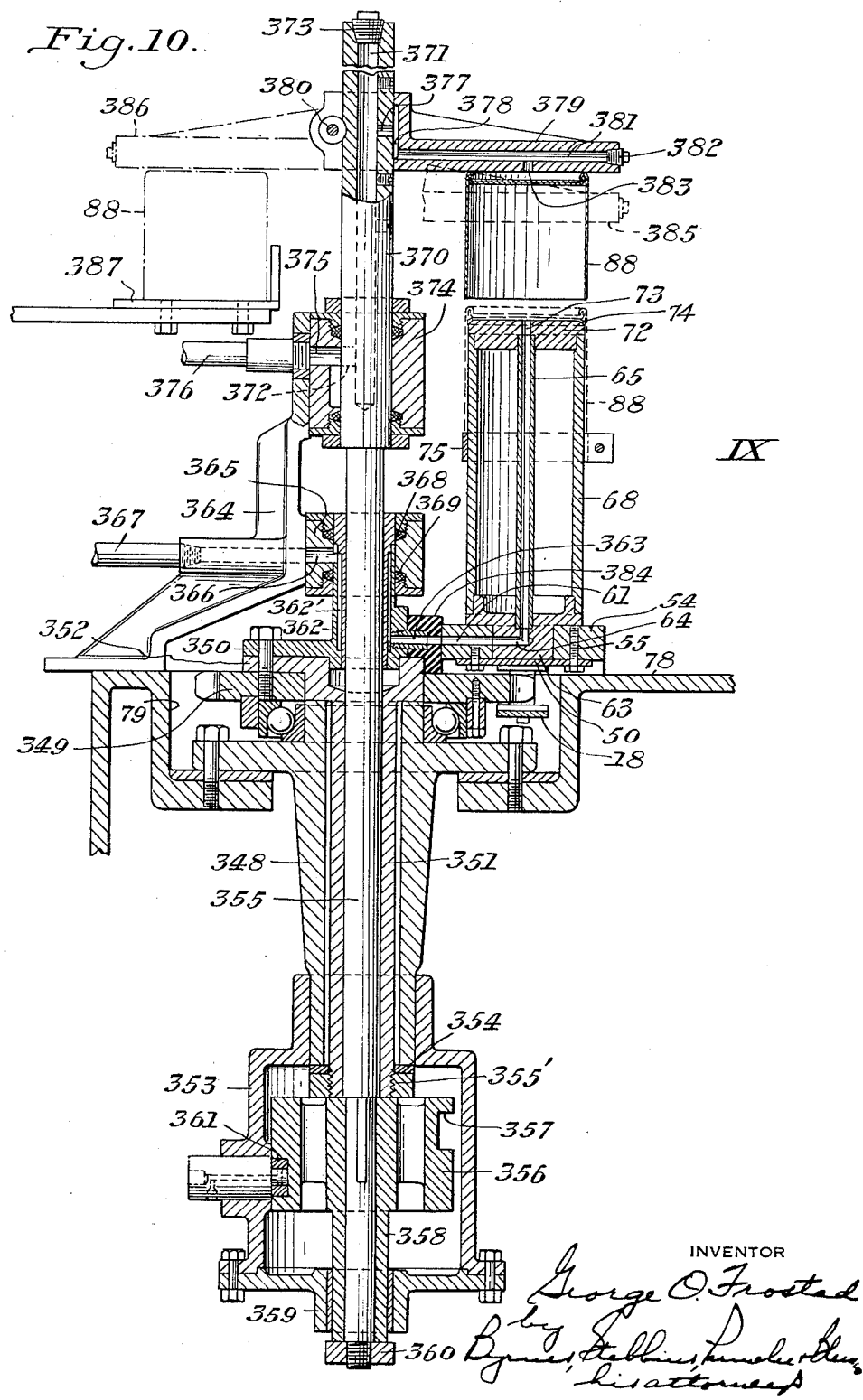

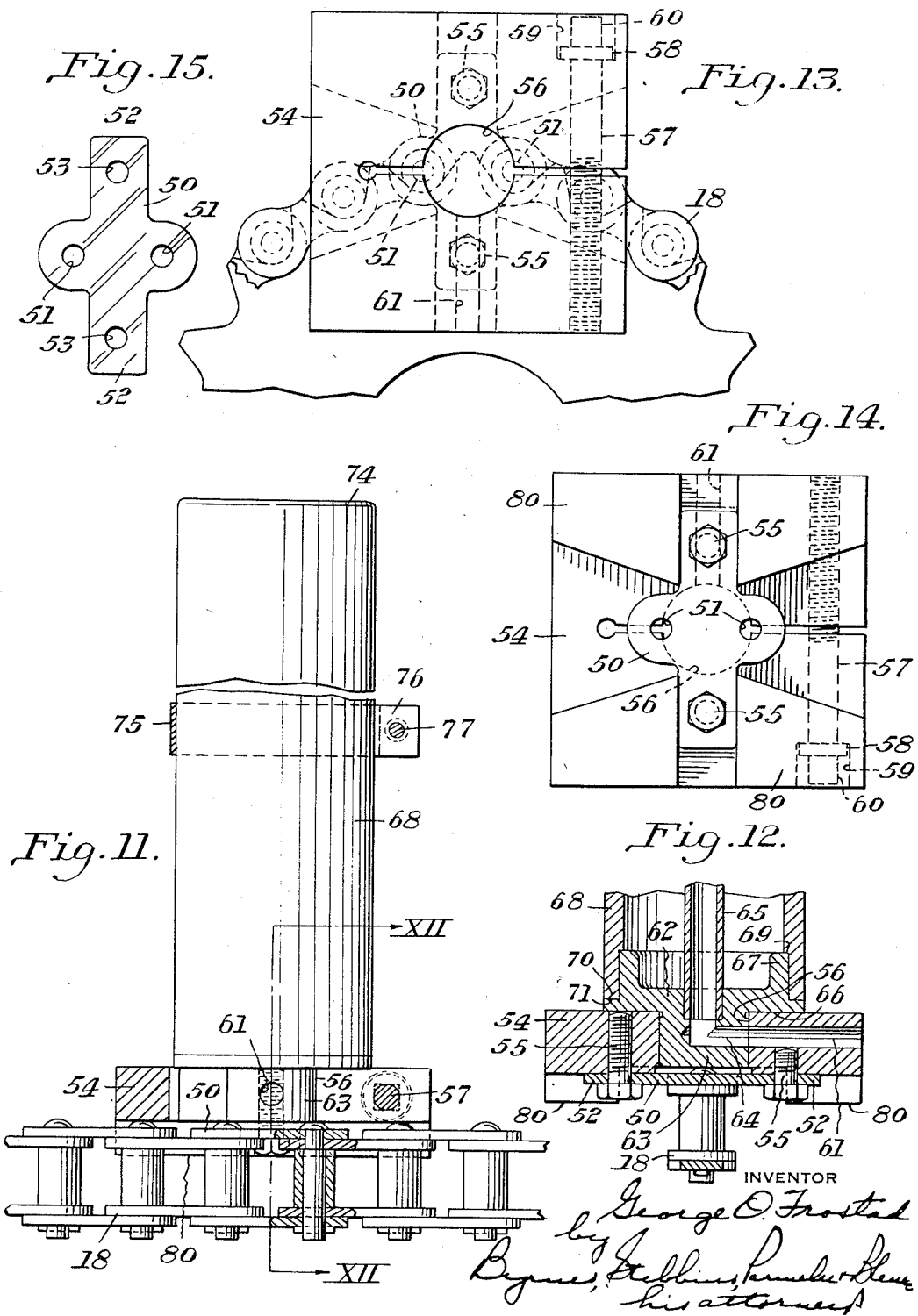

Jan. 7, 1936. G. O. FROSTAD 2,026,780
METHOD OF AND APPARATUS FOR PERFORMING
MECHANICAL OPERATIONS ON MOVING WORK
Filed April 9, 1931   12 Sheets-Sheet 12

INVENTOR
George O. Frostad
by Byrnes, Stebbing, Parmelee & Blenko
his attorneys

UNITED STATES PATENT OFFICE 2,026,780

METHOD OF AND APPARATUS FOR PERFORMING MECHANICAL OPERATIONS ON MOVING WORK

George O. Frostad, Cudahy, Wis., assignor, by mesne assignments, to Sutherland Paper Company, Kalamazoo, Mich.

Application April 9, 1931, Serial No. 528,828

14 Claims. (Cl. 93—55)

This invention relates broadly to a method of and apparatus for performing mechanical operations on moving work. It relates more particularly to the art of performing mechanical operations on work while moving substantially continuously and without interrupting or changing the speed of the movement of the work.

In certain of its more specific aspects, the invention relates to a method of and apparatus for operating upon a moving blank, as, for example, a blank of workable material such as might be used for forming a container or carton.

In many branches of industry, occasion often arises to perform a mechanical operation or series of mechanical operations on work as it moves forward in a more or less continuous advance, as in a manufacturing or assembling process. Often the work is placed in motion at a certain point in the system and it is desired that it undergo one or more operations before being completed or delivered at another point. In such cases there are certain desiderata in order that the process may be as efficient as possible, both from the standpoint of the time consumed by the operation or operations and from that of the power necessary to operate the machinery. It is also, of course, desirable that the machinery be of as simple construction as practicable consistent with the work it is to do, and that its initial cost and the expense of keeping it in repair be as low as possible. Still further, the process should be carried on in such a manner as to minimize the danger of damage to or destruction of the work.

As a general rule, in continuous or substantially continuous manufacturing or assembling processes the work should be advanced as rapidly as possible and should not be subjected to abrupt changes in speed or direction, and the position of the work should not be altered during the process unless necessary. If any operation is more than instantaneous in point of time, either the work must be halted at the operating mechanism or the operating mechanism must move forward with the work until the operation is completed.

I find it highly advantageous to mount the operating mechanism in such a manner that it may move forward with the work and at the same time maintain a desired relationship with its own supporting means. To this end I provide for advancing the work during at least a portion of the operation generally along a circle arc and arranging the operating mechanism so that it will bodily traverse such arc in cooperative relation to the work and at the same time continually remain at a fixed distance from an axis at the center of the arc. This enables mounting of the operating mechanism or tool to swing about an axis passing through the center of the arc and perpendicular to its plane.

Such an arrangement adapts itself ideally to apparatus embodying a flexible work carrier, which may be guided concentrically about an axis perpendicular to its plane of motion by a pulley, sheave or the like. The flexible carrier may conveniently be of the endless type, and I have found it very satisfactory to use an endless sprocket chain passing around and meshing with a sprocket rotatably mounted upon a shaft whose axis passes through the center of the arc along which it is desired to advance the work. The use of a sprocket and chain has the advantage that the sprocket teeth meshing with the links of the chain prevent slippage of the carrier, making it possible to substantially exactly predetermine the arrival of the work at a fixed point on the periphery of the tool support so that the tool may be positioned to properly cooperate with the work as it moves through the arc.

It is desirable that the arc traversed by the work in cooperative relation with the tool be of sufficient extent to enable the tool to fully and completely perform the desired operation while the work is traversing such arc, and I find it satisfactory in most cases to arrange the apparatus so that the arc in question is approximately 180°. This means that the carrier leaves the operating station in a direction generally opposite that in which it entered, and assists in conserving space.

The use of a flexible work carrier, which is preferably of the endless type, as above mentioned, makes it convenient to provide a plurality of operating stations, the carrier passing successively around the respective tool supports. The carrier may, if desired, pass around different supports in different directions, as, for example, alternately clockwise and counter-clockwise. A machine may thus be produced which will consume comparatively little space.

By an arrangement such as that mentioned the entire machine may operate continuously at constant speed and the work may be moved steadily forward, entering and leaving each arc of co-operation with a tool by a tangential path, thus avoiding any abrupt changes in direction. The operating tools rotate constantly, and the waste of power occasioned by the use of reciprocating machine elements is obviated. The machine may be operated at high speed and with high efficiency. The construction of the tools and their supporting and operating mechanism is greatly simplified, thus reducing both the first cost and expense of upkeep. By reason of the fact that the tool and work move together at the same speed throughout the operation there is no appreciable danger of damage to or destruction of the work.

Although by no means so limited, my invention is well adapted for use in the making of containers, and I have embodied it in an eminently successful machine for making fibrous containers by assembling and operating upon blanks of fibrous material. Such machine forms the basis of the description of a present preferred embodiment of the invention to follow.

To the ends above mentioned I provide a method of performing a mechanical operation on work moving on a work carrier, comprising moving the work along a path at least a portion of which is disposed substantially as a circle arc, and operating upon the work by a tool which traverses said portion of the path at the same angular speed as the work. More specifically I provide a method of making containers, comprising advancing a blank along a predetermined path at least a portion of which is disposed substantially as a circle arc, and operating upon the blank by a tool which traverses said portion of the path at the same angular speed as the blank.

I further provide a machine of the class described, comprising means for bodily moving work to be operated on through a path at least a portion of which is disposed substantially as a circle arc, an operating tool mounted for bodily movement through said portion of the path and in cooperative relation to the work, and means for operating the tool while moving in said cooperative relation to the work to perform a desired operation thereupon. Still further and more specifically I provide apparatus for making containers, comprising a blank carrier bodily movable substantially in a circle arc, an operating tool pivoted for movement in such circle arc in operative relation to the blank carrier, and means for operating the tool during such pivotal movement.

Other objects and advantages of the invention will become apparent as the following description of a present preferred embodiment thereof proceeds.

In the accompanying drawings I have illustrated a present preferred embodiment of the invention, wherein Figure 1 is a horizontal sectional view, partly diagrammatic and with portions cut away, of a machine for manufacturing containers by assembling and connecting body and closure blanks, the section being taken along a plane above the work carrying mandrels and below the operating tools which lie over the mandrels at the respective operating stations;

Figure 2 is a diagrammatic horizontal sectional view similar to Figure 1, all mechanism above the plane of the endless carrier being removed;

Figure 3 is an elevational view to enlarged scale of the mechanism for positioning and seating the body blanks on the work carrying mandrels;

Figure 3a is an elevational view to further enlarged scale of a portion of the mechanism shown in Figure 3;

Fig. 3b is a tranverse sectional view taken along the line III$^b$—III$^b$ of Figure 3a;

Figure 4 is a central vertical sectional view of the mechanism for placing the body blanks over the work carrying mandrels, such view being taken along the line IV—IV of Figure 1;

Figure 4a is a horizontal sectional view to enlarged scale taken along the line IV$^a$—IV$^a$ of Figure 4;

Figure 4b is an elevational view of the cam effective for raising and lowering the mechanism shown in Figure 4;

Figure 5 is a vertical sectional view, partly broken away, taken along the line V—V of Figure 1 and showing the inner closure disc forming and feeding mechanism and the mechanism for seating the inner closure disc in the body blank;

Figure 6 is a vertical sectional view of a portion of the mechanism shown in Figure 5 but to larger scale and looking from the opposite direction, the parts being in a different operating position;

Figure 6a is a plan view to further enlarged scale of the disc supporting shelf shown in Figure 6;

Figure 7 is a vertical sectional view of one of the spinning tools for crimping together the body and closure blanks, the section being taken through the axes of the tool support and spinning tool;

Figure 7a is a vertical sectional view of a portion of the mechanism broken away from the bottom of Figure 7;

Figure 8 is a vertical sectional view similar to Figure 7 of the expanding mechanism for expanding the crimped together portions of the body blank and inner closure disc preparatory to application of the outer closure disc;

Figure 9 is a vertical sectional view taken approximately along the line IX—IX of Figure 1 and showing the mechanism for feeding the outer closure discs and the mechanism for applying such discs to the partly formed containers;

Figure 10 is a vertical sectional view similar to Figures 7 and 8 of the mechanism for removing the finished containers from the mandrels and transferring them to a conveyor;

Figure 11 is an elevational view to enlarged scale and partly in section of one of the work carrying mandrels, showing its connection with the endless carrier sprocket chain;

Figure 12 is a vertical sectional view of a portion of the mechanism shown in Figure 11 and taken along the line XII—XII of that figure;

Figure 13 is a plan view of the mandrel carrier with the mandrel removed therefrom and showing such carrier as carried by the sprocket chain, the latter being in engagement with one of the sprockets of the machine;

Figure 14 is an inverted plan view of the mandrel carrier shown in Figure 13;

Figure 15 is a plan view of a special link used for connecting the mandrel carrier to the chain.

GENERAL DESCRIPTION OF THE PREFERRED MANNER OF PRACTICING THE METHOD

Figure 16:
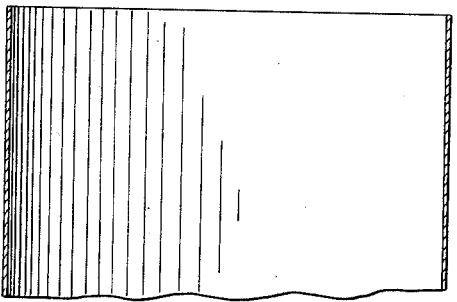
Figures 16 to 21, inclusive, are, respectively, central vertical sectional views of the body blank and closure blanks at several stages during the formation of the container, Figure 21 illustrating the finished container.

The present preferred manner of practicing the method herein described in connection with a present preferred embodiment of the apparatus contemplates the manufacture of containers of fibrous material by assembling a cylindrical body blank and two end closure blanks. In the copending application of James E. Annen, Serial No. 535,648, filed May 7, 1931, there are disclosed and claimed a container and method of making same, which container is adapted to be manufactured and which method is adapted to be practiced on the machine and in the manner herein described.

The cylindrical body blanks are preferably cut from long preformed fibrous tubes in a manner well known in the art. For any given size of container to be manufactured the body blanks are cut to a desired uniform length, and they are supplied to the container manufacturing apparatus by being deposited on end and side by side upon an endless belt conveyor, which conveyor successively moves the blanks into a position at which they are removed from the conveyor and taken into the machine. Such conveyor is shown at I in each of Figures 1 and 2.

The conveyor I moves the blanks toward a feeding Station II, which station comprises a continuously rotating vertically arranged spindle carrying a generally horizontally projecting arm which, at each revolution of the spindle sweeps one of the blanks off of the conveyor. The surface of the arm which comes in contact with the blanks is concavely curved so as to lie snugly against the outer surface of the blank and is provided with a suction channel having ports communicating with its curved surface, a vacuum pump being connected with the suction channel for creating a suction through such ports whereby to hold the blank in position suspended from the arm. Therefore, as the blank is swept off of the conveyor, it is prevented from falling by the suction which holds it to the rotating arm.

Also connected with the spindle is a sprocket which rotates with it and which meshes with an endless sprocket chain. The sprocket chain is provided at intervals with blank carrying mandrels which extend substantially vertically and whose upper peripheral edges are beveled for certain purposes to be presently explained. The sprocket chain moves through the machine and through various operating stations therein and is the means by which the successive blanks are brought into cooperative relation with the operating mechanisms at the various stations which successively perform mechanical operations on the blanks as the container is being manufactured.

The mechanism at Station II is so synchronized that as the chain moves around the sprocket one of the mandrels assumes a position directly beneath each blank swept off of the conveyor I by the rotating arm. After the blank has cleared the conveyor, the spindle with which the arm is connected is lowered without interrupting its rotation until the blank seats over the upper extremity of the mandrel, being aided in so doing by the beveled upper edge of the mandrel. As soon as the blank has been seated over the mandrel the suction communicated to the ports in the arm is cut off, and as the spindle continues its downward movement a flat pressing device descends against the upper surface of the blank and pushes it downwardly over the mandrel. The mandrel is provided about its outer surface with an adjustable annular stop against which the lower extremity of the blank is adapted to seat to insure proper positioning of the blank on the mandrel for the succeeding operations. However, except when very short blanks are used, no attempt is made at Station II to press the blank all the way down on the mandrel until it seats against the stop, as it might not be convenient to continue the movement of the mandrel concentrically around the axis of the spindle for a distance sufficient to enable the blank to be fully seated. Therefore, as the mandrel, carrying the blank over its upper extremity, leaves Station II, the blank has not yet been seated on the annular stop on the mandrel and hence is not yet in position to be operated upon by the forming tools.

Station II is typical of the operating stations in the machine in that the blank is moved through a circle arc at the center of which is the axis of the spindle, this provision enabling a mechanical operation to be performed on the blank by a tool rotating with the spindle but at the same time moving axially thereof. The axial movement of the tool may be so regulated that it moves out of contact with the blank a suitable time interval before the blank leaves its circular path about the axis of the spindle.

As the mandrel carrying the blank leaves Station II, it enters another operating Station III which has an endless element moving about spaced parallel horizontal shafts at different elevations. The sprocket chain moves in a straight line through Station III directly underneath the endless element, passing first under the higher end thereof and moving toward the lower end. The endless element carries pressing devices synchronized to position themselves directly above the respective mandrels and having a horizontal speed component equal to the speed of movement of the sprocket chain. Therefore, as the mandrel carrying the blank passes through Station III, one of the pressing devices moves downwardly into contact with the upper surface of the blank and gradually pushes the blank down on the mandrel until the blank is properly seated against the annular stop. The parts are so proportioned that as soon as the blank has been thus seated it passes out of contact with the pressing device.

Figure 17:
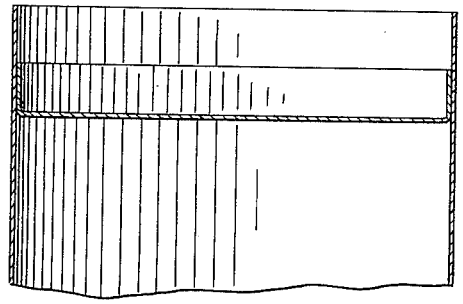

The mandrel carrying the seated body blank then moves to another Station IV provided with a sprocket around which the chain passes and with a spindle at the center of the sprocket. Means is provided at Station IV for successively cutting circular discs out of a strip of fibrous material unwound from a coil. As each disc is cut out it is fed laterally into a circular path concentric with the spindle at Station IV and is positioned directly above an incoming blank and mandrel, suitable guide devices being provided for the purpose. The blank and disc thus move in a circular path about the spindle at Station IV at the same speed, the one directly below the other. The diameter of the disc is substantially greater than the diameter of the body blank. As the disc and blank move forward together, a plunger, also mounted to swing about the axis of the spindle, descends and forces the disc concentrically through a flanging die and then into the top of the body blank and against the upper surface of the mandrel. A holddown device is used in conjunction with the plunger so that the plunger may be withdrawn from the flanged disc, and upon continued forward movement of the sprocket chain the mandrel carrying the seated body blank in which is positioned the flanged disc moves forward to the succeeding station. The body blank alone is shown in Figure 16 and the body blank with the flanged disc positioned within it as just described is shown in Figure 17.

As the mandrel carrying the body blank with the flanged disc within it moves forward from Station IV, it passes first around a guiding sprocket for changing its direction and then enters another operating Station V. The Station V is similar to Stations II and IV, having a sprocket carried by a spindle and an operating tool also connected with the spindle for operating upon the blank as it moves concentrically about the axis of the spindle. The operating tool at Station V is what is well known in the art as a spinning tool and comprises a rapidly rotating die having an annular recess adjacent its periphery for spinning down the extremity of the body blank which projects upwardly above the flange of the disc positioned therein. The extremity of the body blank is turned inwardly and downwardly, the periphery of the body portion of the flanged disc being at the same time pressed down over the beveled edge of the mandrel so that as the blank leaves Station V it is substantially in the condition shown in Figure 18. The spinning operation leaves the downwardly and inwardly turned extremity of the body blank loosely positioned within the flanged closure member and with its extremity disposed within an annular depression formed in the body of such closure member where it is pressed down over the beveled edge of the mandrel.

Figure 19:
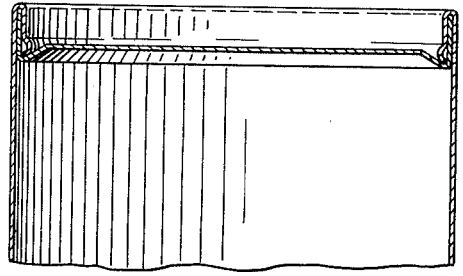

The blank then passes to another Station VI of the same general type, but provided with an expanding tool rotating about the axis of the station but not about its own axis, such tool pressing together in a direction radially of the blank the outer wall of the blank, the flange of the closure disc and the inturned wall extremity. At the same time the expanding tool causes the extremity of the inturned wall portion of the body blank to bulge slightly so as to form an inwardly projecting bead seated within the annular depression in the body of the flanged closure member, as shown in Figure 19. Such bead greatly assists in strengthening the closure and is so positioned that it may subsequently be compressed by a second closure disc to lie substantially entirely within the annular depression in the body of the flanged closure member.

From the Station VI the blank moves to a Station VII, somewhat similar to Station IV, at which a second or outer closure disc is applied. This closure disc is made of material of substantially greater thickness than the flanged or inner closure member and is smaller in size so as to snugly fit within the inturned wall extremity of the body blank. The outer closure disc lies flat against the body of the inner flanged closure member and the peripheral edge of the outer disc lies in contact with the bead formed at the extremity of the inturned wall portion of the body blank and which, as above mentioned, lies substantially entirely within the annular depression in the body of the flanged closure member. The outer disc, bearing firmly against the body of the inner closure member and also against the bead mentioned, adds great strength to the closure and positively prevents the extremity of the body wall from becoming disengaged from the inner closure member. The outer closure disc is shown in place as applied at Station VII in Figure 20.

Figure 20:
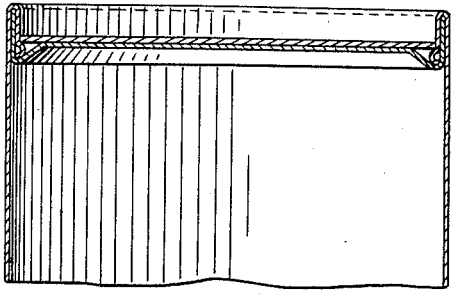
Figure 21:
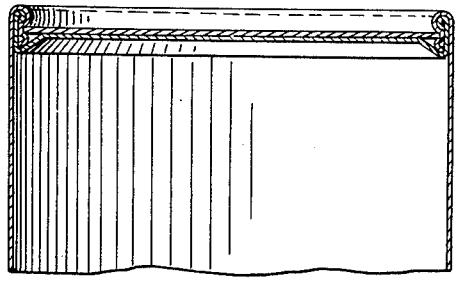

The container shown in Figure 20 is itself a practicable and usable article without further refinement, but I prefer to additionally strengthen the closure by spinning in the extremity thereof so as to form a bead outside the outer closure disc, which bead serves to maintain such disc in place and cooperates with the inner bead to insure proper positioning thereof. The completed container as thus formed is shown in Figure 21. The final spinning operation is performed at Station VIII, which is substantially identical with Station V except for the contour of the spinning tool.

The completed container passes from Station VIII to Station IX where it is removed from the mandrel. At Station IX there is a rotatable central spindle as at the other stations, such spindle having an outwardly extending arm provided with a flat under surface and a vacuum duct leading to such flat under surface and connected with a vacuum pump. Each mandrel is provided internally with an air pipe which extends upwardly from its base substantially axially thereof and which terminates in a small opening at the center of the upper face of the mandrel. At Station IX the mandrel moves into a position in which a source of air pressure is disposed to cooperate with the air pipe therein, such air pressure being effective for blowing the inverted finished container upwardly off of the mandrel and against the flat under surface of the outwardly extending arm connected with the rotatable spindle. At such time a vacuum is created in the duct in such arm whereby to maintain the container suspended therefrom and the arm is moved upwardly to raise the container clear of the mandrel. The arm rotates to a discharge position where the vacuum is cut off and the container is allowed to drop upon a suitable conveyor which carries it away from the machine.

THE PREFERRED EMBODIMENT OF THE MACHINE

The present preferred embodiment of the apparatus, comprising a machine for making containers, will now be described.

*The driving mechanism*

Referring now more particularly to Figures 1 and 2, the latter of which is intended especially to illustrate the driving mechanism for the machine, the driving power may be derived from any suitable source and is transmitted to the machine by an endless driving belt 2. The belt 2 passes around a pulley 3 adapted for connection with a driving shaft 4 by a clutch 5. The driving shaft 4 carries a spur pinion 6 which drives an ordinary differential gear 7 which, in turn, drives two oppositely directed countershafts 8 and 9. The countershaft 8 carries a bevel gear 10 meshing with a bevel gear 11 connected to rotate with a vertical shaft or spindle 12. The countershaft 9 carries a bevel gear 13 meshing with a bevel gear 14 connected to rotate with a vertical shaft or spindle 15. Also connected to rotate with the respective spindles 12 and 15 are sprockets 16 and 17 (Figure 1) which drive the endless sprocket chain to be described. By reason of the provision of the differential gear 7, the power is divided equally between the countershafts 8 and 9, and therefore the endless chain is driven at two points instead of one, as is usual, preventing the accumulation of undue slack due to wear and increasing the efficiency of the driving mechanism.

The sprockets 16 and 17 drive an endless sprocket chain 18 which serves the double purpose of a work carrier and a driving device for the various tool supports. In addition to the sprockets 16 and 17, there are seven other sprockets, one at each of operating Stations II, IV, V, VI, VII, VIII and IX, above described. Each of such seven sprockets is driven by the sprocket chain 18 and also serves, in conjunction with the sprockets 16 and 17, to guide such chain, and consequently the blank carrying mandrels, presently to be described, in the desired endless path in cooperative relation with each of the nine operating stations of the machine.

The countershaft 9 carries a series of different sized sprockets 19 adapted to cooperate with another series of sprockets 20 and with a driving chain to drive at a desired speed the endless conveyor I. The countershaft 9 also carries a bevel gear 21 meshing with the bevel gear 22 keyed to a shaft 23 carrying an eccentric cam 24 effective, as will presently be described, for raising and lowering the spindle at Station II.

The countershaft 8 carries a bevel gear 25 meshing with a bevel gear 26 keyed to a shaft 27 carrying sprockets 27', 28 and 29, respectively, for driving the body blank seating device, the paper feed for the roll from which the inner closure members are cut out and the mechanism for cutting out such closure members, as will be described.

The driving shaft 4 carries a bevel gear 30 meshing with a bevel gear 31 keyed to a shaft 32 carrying a sprocket 33 for driving the feeding mechanism for the outer closure discs.

There is also provided a pair of electric motors 34 and 35, respectively, the former having a shaft 36 carrying a sprocket 37 for driving a sprocket chain 38 meshing with a sprocket 39 keyed to a shaft 40 carrying a bevel gear 41 which meshes with a bevel gear 42 for driving the spinning tool at Station V. The motor 35 has a shaft 43 carrying a sprocket 44 for driving a sprocket chain 45 meshing with a sprocket 46 keyed to a shaft 47 carrying a bevel gear 48 which meshes with a bevel gear 49 for driving the spinning tool at Station VIII.

Thus the power for driving all of the elements of the machine per se is delivered by the endless driving belt 2 and transmitted through the various connections mentioned. The rotation of the two spinning tools proper at Stations V and VIII is the only driving function in the entire apparatus power for which is not derived from the main driving belt 2, it being more satisfactory to utilize the electric motors 34 and 35 for this purpose.

*The driving chain and blank carriers*

The driving chain 18 is of usual sprocket chain construction except that at intervals it is provided with special links 50 (Figure 15) These special links 50 take the places of normal links at the top of the chain at points at which it is desired to connect with the chain the blank carrying mandrels. The manner in which the mandrels are connected with the chain is shown in Figures 11 to 14, inclusive. The pivot pins of the chain pass through the holes 51 of the link 50 so that the arms 52 of the link project laterally from the chain. Each of such arms is provided with a hole 53.

Adapted for connection with each of the special links 50 is a mandrel carrying block 54 having threaded holes for the reception of bolts 55 passing through the holes 53 in the arms 52 of the special link and which fasten the block to the link. Each block 54 has a circular central opening 56 and is split, as shown in Figures 13 and 14, so that the opposite halves thereof are adapted to be sprung toward each other. For this purpose a tightening bolt 57 is provided which has an enlarged head 58 at one end seated within a recess 59 in one of the opposite halves of the block 54 and whose opposite end is threaded to engage with threads in a hole in the opposite half of the block. The extremity 60 of the bolt 57 may be squared for the reception of a suitable wrench or key. The block 54 is also provided with a transverse passage 61 which extends from one of its outer faces and terminates in the central opening 56.

Adapted for cooperation with each block 54 is a hub member 62 having a reduced circular lower portion 63 adapted to be received within the central circular opening 56 in the block. The lower portion 63 of the hub member 62 is provided with an L-shaped passageway 64, one leg of which is adapted, when the hub member is in place on the block, to communicate with the passageway 61 in the block. The other leg of the L-shaped passageway 64 extends upwardly substantially axially of the hub member 62; and the hub member is adapted to receive an axially upwardly extending pipe 65 in communication with the upwardly extending leg of the L-shaped passageway 64, for a purpose to be presently described. The hub member 62 has a shoulder 66 adapted to rest on the upper surface of the block 54, whereby to properly position the hub member with respect to the block. When the lower reduced portion 63 of the hub member is inserted into the opening 56 in the block, the position of the hub member is so adjusted that the horizontally extending leg of the L-shaped passageway 64 therein directly communicates with the passageway 61 in the block, and the bolt 57 is then tightened to bring together the opposite halves of the block and thereby firmly connect the block and hub member. The hub member has a reduced upper extremity 67 about which the mandrel 68 is adapted to snugly fit. The mandrel has a shoulder 69 adapted to seat against the upper corner of the hub member, and the lower extremity 70 of the mandrel is also adapted to seat upon a shoulder 71 of the hub memer so that the mandrel is thereby properly positioned to extend upward axially of the hub member and also concentrically with the pipe 65. The mandrel is provided at its upper extremity with a head 72 (Figure 10) which snugly fits therein and which has a central opening 73 adapted for communication with the pipe 65. The upper peripheral corner of the head 72 is beveled as at 74, for a purpose to be described. The mandrel is encircled by a metal band 75, the opposite extremities of which are connected at 76 by a bolt 77. By loosening the bolt 77 the band 75 may be shifted to desired adjusted positions axially of the mandrel. Such band serves as a stop for limiting downward movement of the body blanks over the mandrel, as will be described.

The machine has a flat top 78 (Figures 1, 2 and 3) in which is provided a groove 79 for reception of the sprocket chain 18, such groove extending throughout the entire path of the chain. The depth of the groove 79 is somewhat greater than the height of the sprocket chain 18 (Figure 3) so that the chain does not normally touch the bottom of the groove, being suspended from the respective blocks 54. The lower flat surfaces 80 (Figures 3, 11 and 12) of the respective blocks rest upon the flat top of the machine and slide thereover under the propulsion of the chain so that the weight of the mandrels is carried directly by the flat top of the machine, which insures proper positioning thereof for the various operations to be performed upon the blanks carried thereby.

The construction of the special links 50, blocks 54 and hub members 62 is such that the axis of each mandrel passes through the transverse center line of its corresponding link 50,—that is to say, through a line equidistant from the centers of the link pivot pin holes 51. This provision enables the axis of each mandrel, when moving in the circular path at each operating station, to fall upon the center line of a tooth of the sprocket at such operating station, which in turn allows for more exact determination of the distance from the axis of the station spindle to the axis of the mandrel during the performance of the operation carried out at the station. It also assures a proper positioning of the mandrel for cooperation with the tool. The distance between the axis of the station spindle and the axis of the tool is made equal to the distance between the axis of the station spindle and the axis of the mandrel, and the axis of the tool is positioned to pass through the center line of the sprocket tooth over which the mandrel is to pass as it moves through the station. The cooperative relationship of the axis of the mandrel and the center line of one of the sprocket teeth is shown in Figure 13.

*The body blank supplying means—Station I—Figures 1 and 2*

The body blank supplying means comprises an ordinary endless belt conveyor I driven from a shaft 81 carrying a gear 82 meshing with a gear 83 carried by a parallel shaft 84, upon which the sprockets 20, above described, are also mounted. The shaft 84 is driven from the countershaft 9 by a sprocket chain 85 which may be engaged over any desired set of the sprockets 19 and 20 so that the speed of the conveyor I can be regulated as desired. The conveyor I delivers the body blanks onto a shelf 85' from which they are adapted to be removed and introduced into the machine by mechanism at Station II presently to be described. The conveyor is mounted upon a frame 86 of usual construction and has side guides 87 spaced apart a distance only slightly greater than the external diameters of the body blanks so as to direct such blanks to a desired position on the shelf 85' and into proper cooperative relationship with the machine feeding Station II. The body blanks being supplied by the conveyor I are shown at 88 in Figure 1, the direction of movement thereof being that indicated by the arrow A in such figure.

*The means for introducing the body blanks into the machine—Station II—Figures 4, 4a and 4b*

The machine top 78 has downwardly and inwardly extending flange portions 89 to which is connected by bolts 90 through a pad 90' a stationary bearing sleeve 91. Rotatably mounted within the bearing sleeve 91 is a lower inner sleeve 92 having a flange 93 through which it is connected by circumferentially spaced bolts 94 with an upper sleeve 95 having a flange 96, the bolts 94 connecting both of the flanges 93 and 96 to a sprocket 97. The sprocket 97 is journaled for rotation about the upper extremity of the bearing sleeve 91 by suitable ball bearing means 98. A collar 98' threaded to the lower extremity of the sleeve 92 abuts the foot of the bearing sleeve 91 and prevents the sleeve 92 from moving upwardly therein.

The sprocket chain 18 carrying the mandrels 68 meshes with and drives the sprocket 97. As the machine operates, the sprocket chain moves tangentially into mesh with the sprocket 97 and carries the mandrels in their circular path about the axis of the sprocket, as above described. The respective flanges 93 and 96 of the lower and upper sleeves 92 and 95 are cut away at 99 (Figures 1 and 4) to make room for the mandrel carrying blocks 54, only one such cut away portion being necessary inasmuch as only one mandrel carrying block passes around the sprocket upon each revolution thereof. As each mandrel carrying block passes into cooperative relation with the sprocket, one side of its flat lower face 80 rides directly upon the upper surface of the sprocket, as shown in Figure 4, which upper surface is at the same level as the flat top 78 of the machine.

Carried within and splined to the respective sleeves 92 and 95 is a spindle 100 having an axial bore 101 which is plugged at its upper extremity at 102. The spindle 100 has near its lower end an annular flange 102' rotatably positioned within a bearing 103 made in two halves connected together by bolts 104. The bearing 103 carries a downwardly projecting lug 105 to which is pivoted at 106 a block 107.

The cam 24 carried by the shaft 23, as above described, is provided with an eccentric track 108 in which moves a follower 109 at one extremity of a lever 110 fulcrumed at 111 to a standard 112 connected with the machine frame. At its extremity opposite the follower 109 the lever 110 has a slot 113 for slidably receiving the block 107. Upon rotation of the cam 24 the lever 110 is rocked about its pivot 111, raising and lowering the bearing 103 and the spindle 100 while permitting rotation of the spindle. The spindle 100 is shown in Figure 4 in its extreme upper position with the bearing 103 practically in contact with the collar 98'.

Connected with the spindle 100 by means of a clamping bolt 114 is a generally horizontally projecting arm 115 having a concavely curved vertical surface 116 adapted to contact with and lie snugly against the outer surfaces of the respective blanks 88. The arm 115 has a bore 117 plugged at its outer extremity at 117' from which lead a number of ducts 118 terminating in the concavely curved vertical surface 116. The spindle 100 has a port 119 extending inwardly from its peripheral surface and joining the bore 101, such port establishing communication between the bore 101 of the spindle 100 and the bore 117 of the arm 115.

Entering through the bearing 103 is a suction conduit 120 which communicates with a port 121 in the lower portion of the spindle 100, which port extends inwardly from the peripheral surface of the spindle to its bore 101. The suction conduit 120 leads to a vacuum pump or other suction device (not shown). The port 121 extends only throughout a portion of the periphery of the spindle, so that as the spindle rotates within the bearing 103, the suction created by the vacuum pump will be communicated with the bore 101 of the spindle throughout a portion of each revolution thereof only. When the port 121 does not communicate with the suction conduit 120 the suction will not be transmitted to the bore 101, and consequently it will not be transmitted to the bore 117 and the ducts 118.

Also connected with the spindle 100 above the arm 115 by means of bolts 122 is a pressing arm 123 having a flat under surface 124 adapted to contact with the upper surface of each of the blanks 88.

The spindle 100 is in its uppermost position, as shown in Figure 4, as, upon its rotary movement, the arm 115 approaches one of the body blanks 88 on the shelf 85', and as the arm comes into contact with the body blank the port 121 is in communication with the suction conduit 120 so that the body blank, as it is swept off of the shelf by the arm 115, is suspended from the arm by the suction within the ducts 118. At the same time, one of the mandrels 68 is moving concentrically with the spindle 100 and directly beneath the suspended body blank 88. As soon as the blank has cleared the shelf 85' the cam 24 causes the spindle 100 to move downwardly, depositing the blank over the upper extremity of the mandrel. At such time the rotation of the spindle relatively to the bearing 103 causes the port 121 to move out of communication with the suction conduit 120 and the suction is cut off. Immediately upon cutting off of the suction and upon continued downward movement of the spindle 100, the pressing arm 123 contacts with the upper surface of the blank and pushes the blank down some distance over the upper portion of the mandrel. The blank preferably fits the mandrel snugly so as to hold it by friction against rotation with respect to the mandrel during subsequent operations.

The bands 75 on the respective mandrels 68 have previously been positioned at the proper height so that upon seating of the bottoms of the respective body blanks thereon, such blanks will be in position to pass through the various operating stations. However, as above stated, except when very short blanks are used, no attempt is made at Station II to press the blank all the way down until it seats against the stop on the mandrel, this being done at the succeeding station. As the mandrel and blank move away from Station II, the spindle 100 again moves upwardly and suction is again communicated with the ducts 118 for cooperation with the succeeding blank.

*The means for seating the body blank in proper working position on the mandrel—Station III—Figures 3, 3a and 3b*

After the sprocket chain 18 leaves Station II it runs for a distance in a straight path before again passing around a sprocket, and Station III is arranged at such straight portion of the chain's path. At each of two spaced points longitudinally of the path of the chain there are provided two brackets, one on each side of the chain and substantially directly opposite one another, one set of such brackets being designated 125 and the other set 126. Each of the four brackets is connected with the frame by bolts 127. Each bracket 125 carries an upright rod 128 and each bracket 126 carries a similar upright rod 129, the rods 128 being longer than the rods 129.

Each of the rods 128 carries near its upper extremity a sleeve 130 with which is integrally connected an outwardly and upwardly extending bracket 131. Each of such brackets 131 is provided with a generally longitudinally extending slot 132. Mounted for longitudinal adjustment within each of such slots 132 is a bearing block 133, a cross shaft 134 being journaled for rotation in the respective bearing blocks. Rotatably connected with each of the bearing blocks 133 but held against axial movement with respect thereto is an adjusting bolt 135 which threads through the corresponding bracket 131 and is provided with a lock nut 136. By means of the adjusting bolts 135, the bearing blocks 133, and consequently the cross shaft 134, may be adjusted longitudinally of the slot 132 for a purpose to be presently described.

Mounted on each of the rods 129 at a level lower than the respective sleeves 139 is a sleeve 137 with which is integrally connected a bracket 138, such brackets being similar to the brackets 131 except that instead of being provided with longitudinally extending slots they are provided with circular bearing portions 139 in which is mounted for rotation a cross shaft 140. Keyed to the cross shaft 140 is a sprocket 141 with which meshes a sprocket chain 142, such chain also meshing with and being driven by the sprocket 27' (Figure 2). The respective brackets 131 and 138 are connected by angle bars 143, there being two of such bars each with one flange extending downwardly connecting the lower portions of the brackets, and two of such bars each with one flange extending upwardly connecting the upper portions of the brackets. On account of the difference in level of the respective brackets 130 and 138, the respective angle bars are inclined to the horizontal, as shown in Figure 3, the higher ends thereof being disposed in the direction from which the chain 18 advances.

Keyed adjacent each end of each of the shafts 134 and 140 is a sprocket 144, each one of the pair of such sprockets on the shaft 134 being in longitudinal alignment in a line parallel to the direction of movement of the chain 18 with one of the pair of such sprockets on the shaft 140. Connecting each longitudinally aligned pair of sprockets 144 is a sprocket chain 145. The sprocket chain 142 drives the shaft 140 in the clockwise direction, viewing Figure 3, and such shaft, in turn, drives the respective sprocket chains 145 also in the clockwise direction, viewing such figure, and in synchronism with each other. The angle bars 143 serve as guides for the respective sprocket chains 145, as well as serving as the frame work for the operating mechanism at station III. The adjusting bolts 135 serve as take up mechanism for the sprocket chains 145, enabling such chains to be kept tight at all times.

Each of the sprocket chains 145 is provided at intervals with special links 146 having outward projections 147, a stub shaft 148 being mounted in such special links and extending across the gap between the respective chains 145. Hingedly connected with each of such stub shafts 148 is a presser shoe 149 having bosses 150, each of which extends between a pair of the links 147 and receives the stub shaft 148. The outer face 151 of each of the presser shoes 150 is smooth and flat, for a purpose to be presently described.

The respective presser shoes 149, each of which extends transversely between the chains 145, are adapted to move in the same vertical plane as the sprocket chain 18, and the speed of movement of the chains 145 is so regulated that the horizontal component thereof is equal to the longitudinal speed of the chain 18. Likewise the presser shoes 149 are spaced apart on the chains 145 a distance such that one of the shoes will be positioned directly above each of the mandrels moving with the chain 18. Therefore, as the respective mandrels 68 each carrying a body blank 88 move beneath the chains 45, one of the presser shoes 149 cooperates with each of the mandrels to push the respective body blank downwardly thereon until the bottom of such blank engages the band 75. The elevation of the presser shoes may be adjusted as desired for various sizes of body blanks, and is preferably such that as the pivot 148 of each presser shoe reaches a vertical plane containing the axis of the shaft 140, the body blank is just seated and firmly pressed against the ring 75 on its mandrel. As the respective mandrels move forward from Station III, the presser shoes are carried upwardly and in the reverse direction to become again effective for seating subsequent blanks on their respective mandrels. In order that the presser shoes may not strike against and damage the chains 145, such chains are provided at opposite sides of each presser shoe with special links 152 having outward abutments against which the edges of the presser shoes may rest during the reverse movement thereof.

*The means for punching, positioning and applying to the body blank the inner closure member—Station IV—Figures 5, 6 and 6a*

From Station III the mandrel having the body blank in place thereon and seated against the band 75 passes to Station IV at which the inner closure member is punched out of a strip of fibrous material, is positioned over the body blank and is flanged and pressed into the upper portion of such body blank and against the top of the mandrel. Station IV is of the same general type as Station II in that the work is performed on the blank while it is moving concentrically about the axis of the tool support.

At Station IV the machine top 78 has downwardly and inwardly extending flange portions 153 to which is connected by bolts 154 through a pad 155 a stationary sleeve 156. Fixedly mounted within the sleeve 156 is a vertically extending spindle 157 which does not rotate, but which serves to support and guide the rotating parts.

Rotatably mounted upon the upper portion of the sleeve 156 through suitable ball bearing means 158 is a sprocket 159. Connected with the sprocket 159 and extending downwardly therefrom about the ball bearing means 158 is an annular positioning device 160 which assists in centering the sprocket 159 with respect to the axis of the sleeve 156 and spindle 157, inasmuch as the sprocket does not bear against the spindle but is spaced therefrom, as shown in Figure 5. The sprocket chain 18 carrying the mandrels 68 meshes and cooperates with the sprocket 159 in the same manner as at Station II. Lying above and bolted to the sprocket 159 by bolts 161 is a sleeve 162. Such sleeve has a flange 163, a portion of which is cut away at 164 to make room for the mandrel carrying block 54, and a spacing member 165 and a mandrel positioning member 166 lie over the flange 163, the bolts 161 passing through both members 166 and 165 as well as through the flange 163 and into the sprocket 159. The mandrel positioning member 166 is of generally horseshoe shape, as shown in Figure 1, the spacing member 165 being effective for positioning the member 166 so that its lower surface is immediately above the upper surface of the mandrel carrying block 54 (Figure 5). As shown in Figure 1, the extremities of the horseshoe shaped member 166 are shaped to lie substantially in contact with the outer surface of the mandrel and also against the upper surface of the block 54 so as to assist in properly positioning the mandrel as the same moves through the station. Inasmuch as the positioning member 166 is bolted to the sprocket 159 and rotates therewith, it remains in cooperative relation to the mandrel throughout the circular movement thereof as it passes through the station.

The spindle 157 fixedly carries a barrel cam 167 provided with two cam grooves 168 and 169, respectively, for a purpose to be presently described. The rotatable sleeve 162 is offset at 170 to pass freely around the barrel cam 167 and has connected therewith through bolts 171 an upper bearing portion 172 packed against a reduced upper extremity 173 of the spindle 157 by packing 174. A suction conduit 175 connected with a vacuum pump (not shown) enters the top of the spindle 157 and communicates with a passage 176 having a radial port 177 extending to the peripheral surface of the spindle and cooperating with a rotatable valve member 178 fastened to the upper bearing portion 172 by bolts 179. Leading from the valve member 178 is a duct 180 communicating with a transverse passage 181 which, in turn, opens into a chamber 182, for a purpose to be presently described.

Bolted to the sleeve 162 at 183 is a collar 184 to which is integrally connected eccentrically therewith a female flanging die 185 having a circular opening 186. The sleeve 162 has a horizontal projection 187 to which is bolted at 188 a device 189 having a pair of downwardly extending pins 190, for a purpose to be presently described. The sleeve 162 also has an enlarged portion 191 in which is mounted for vertical sliding movement a sleeve 192, to the lower extremity of which is threaded at 193 a male flanging die 194 cooperating with the female flanging die 185. The sleeve 192 is provided with a cam follower 195 operating in the cam groove 169 of the barrel cam 167. Mounted for vertical sliding movement within the sleeve 192 is a rod 196 having an axial bore 197 and carrying a cam follower 198 operating in the cam groove 168 of the barrel cam 167. The upper extremity of the bore 197 is plugged at 199.

The upper bearing portion 172 of the sleeve 162 has a hub portion 200 surrounding the upper portion of the rod 196 and providing the chamber 182, above mentioned. The rod 196 has a port 201 leading from its bore 197 and communicating with the chamber 182. The rod 196 is packed at the upper and lower extremities of the hub portion 200 by packing 202. The rod 196 extends downwardly through the sleeve 192 and has connected with its lower extremity an inside male die member 203 also serving as a stripper, as will be presently described. The die member 203 is shaped to fit exactly within the die member 194 so that upon downward flanging movement the members 194 and 203 move and operate together as a unit. The die member 203 is provided concentrically with a vertical passage 203' which communicates with the bore 197 of the rod 196 and terminates in a hole positioned substantially centrally of the lower face of the die member. One of the mandrels 68 is adapted to be positioned axially of and directly beneath the die members 185, 194 and 203 during the operation performed at Station IV.

Fixedly connected with the frame is a supporting structure 204 provided with a substantially cylindrical vertically extending opening 205 in which is mounted for vertical sliding movement a rod 206, with which is connected at its upper extremity by a bolt 207' a male blanking die 207. The supporting structure 204 is formed annularly at its upper extremity and has connected with it by bolts 208 a female blanking die 209 whose effective die edge 210 is positioned above and spaced somewhat from the upper extremity of the annular supporting member 204 and is positioned to receive the male blanking die 207. Also connected with the upper extremity of the annular support 204 by bolts 211 is a disc receiving shelf 212 which is fixedly positioned in cooperative relation to the mechanism which rotates about the axis of the spindle 157. The shelf 212 is provided in its upper surface with a pair of arcuate grooves 213 whose center lies on the axis of the spindle 157 and in which the lower extremities of the pins 190 are adapted to move during operation of the mechanism.

The lower extremity of the rod 206 carries a cam follower 214 operating in a groove 215 of a cam 216 keyed to a shaft 217 rotatably journaled in the frame at 218 and 219. Keyed to the shaft 217 is a sprocket 220 and meshing with such sprocket and with the sprocket 29 (Figures 1 and 2) is a sprocket chain 221 for driving the shaft 217. Also keyed to the shaft 217 is a cam 222 having a cam groove 223 in which operates a follower 224 carried by a vertically reciprocable rack member 225 meshing with a pinion 226 keyed to a shaft 227 journaled in the frame. Also keyed to the shaft 227 is a pinion 228 with which meshes a rack 229 mounted in the frame at 230 for horizontal reciprocation. The rack 229 has a central bore 231 with which is connected a rubber hose 232, the opposite end of such bore communicating with a port 233 emerging at the lower surface of the rack. The rack 229 is positioned to move over the blanking dies 207 and 209 and also over the disc receiving shelf 212 for a purpose to be presently described.

The end of the rubber hose 232 opposite the end connected with the rack 229 communicates with a valve casing 234 fixedly carried by the frame and in which is adapted to rotate a valve 235 fastened to the extremity of the shaft 217. Leading into the valve casing 234 is a conduit 236, the valve 235 being so designed that through a certain portion of its rotation only the conduit 236 and the rubber hose 232 are in communication. A vacuum pump (not shown) is connected with the conduit 236.

The machine frame carries a stub shaft 237 (Figure 1) on which is mounted a roll 238 of fibrous material of sufficient width that the discs for the inner closure member of the container can be stamped out of it. The roll is positioned by ordinary guide arms 239. The fibrous material, which for simplicity may be termed paper, is delivered from the roll through suitable feeding means 240 actuated by a shaft 241 carrying a sprocket 242 with which meshes a sprocket chain 243 also meshing with and being driven by the sprocket 28. The paper strip passes through another feeding device 244 mounted on a shaft 245 with which is connected a sprocket 246 having meshing therewith a sprocket chain 247 which also meshes with a sprocket 248 keyed to the shaft 217. The shaft 217 is thus effective for driving the paper feed 244. From the feeding mechanism 244 the strip passes under the female blanking die 209, as shown in Figure 5.

As the paper strip is fed forward between the respective male and female blanking dies 207 and 209, rotation of the shaft 217 causes, through the cam 216 and the cam follower 214, upward movement of the rod 206 carrying the male blanking die 207, such die cooperating with the female die 209 to blank out of the strip a round disc of paper, continued upward movement of the die 207 raising the blanked disc above the top of the die 209. At such time the valve 235 is in a position to connect the vacuum conduit 236 with the rubber hose 232 communicating with the bore 231 in the rack 229, the disc consequently becoming attached to the extremity of the rack 229 at the port 233 by suction. Continued rotation of the shaft 217 through he cam 222, the cam follower 224, the rack member 225, the pinion 226, the shaft 227, the pinion 228 and the rack 229 then causes longitudinal sliding movement of the rack 229 toward the left, viewing Figure 5, and toward the right, viewing Figure 6, until the blanked disc is positioned over the shelf 212, as shown in Figure 6. At such time the valve 235 cuts off the connection between the vacuum conduit 236 and the rubber hose 232, and the disc is therefore released by the rack 229 and deposited upon the shelf 212. The rack 229 then moves back to its former position and the male blanking die 207 is lowered for the succeeding cycle.

Just after the blanked disc is deposited upon the shelf 212, rotation of the sleeve 162 about the spindle 157 carries the pins 190 so that their lower extremities enter the grooves 213 in the shelf 212, pushing before them the blanked disc. At such time the male flanging dies 194 and 203 are both in their uppermost position, as shown in Figure 5, and the sleeve 162 is in such position with respect to the spindle 157 that the suction from the vacuum pump in communication with the conduit 175 is communicated to the hole in the bottom of the die 203, thus causing the disc to adhere to such die, it having previously been centered with respect thereto by the pins 190. As soon as rotation of the sleeve 162 carries the disc clear of the shelf 212, the barrel cam 167, by means of its grooves 168 and 169 cooperating with the respective cam followers 198 and 195, causes the rod 196 and sleeve 192, and consequently the dies 203 and 194, to move downwardly together as a unit, forcing the disc through the female flanging die 185 and thereby flanging it, and further forcing such flanged disc out of said die and into the upper extremity of the body blank 88 carried on the mandrel 68 and against the head of the mandrel, as shown in Figure 6.

Continued rotation of the sleeve 162 causes the port 177 to pass out of communication with the passageway leading to the bore 197 in the rod 196, and the suction in the die 203 is consequently relieved. Continued rotation of the sleeve 162 causes, through the cam groove 169 and follower 195, upward movement of the sleeve 192 while the rod 196 and die 203 remain momentarily in their lowermost position against the flanged disc to hold such disc against the head of the mandrel 68, and thereby serve as a stripping mechanism. After the die 194 has passed out of contact with the flanging disc, the stripping die 203, actuated by the cam groove 168 in cooperation with the follower 198, moves upwardly and assumes its normal position within the die 194. The parts then resume their original positions for the succeeding cycle of operations. The mandrel 68, carrying the body blank 88 having the flanged inner closure member within it, moves tangentially away from Station IV, around the sprocket 16 and thence to Station V.

*The first spinning station—Station V—Figures 7 and 7a*

At Station V the machine top 78 has downwardly and inwardly extending flange portions 237' to which is connected by bolts 238' through a pad 239' a stationary sleeve 240'. Fixedly mounted within the sleeve 240' is a vertically extending hollow shaft 241' which does not rotate but which serves to support and guide the rotating parts. Rotatably mounted upon the upper portion of the sleeve 240' through suitable ball bearing means 242' is a sprocket 243'. Connected with the sprocket 243' and extending downwardly therefrom about the ball bearing means 242' is an annular positioning device 244' which assists in centering the sprocket 243' with respect to the axis of the sleeve 240' and hollow shaft 241' inasmuch as the sprocket does not bear against the hollow shaft but is spaced therefrom, as shown in Figure 7.

The sprocket chain 18 carrying the mandrels 68 meshes and cooperates with the sprocket 243' in the same manner as at the previous stations. Lying above and bolted to the sprocket 243' by bolts 245' is a sleeve 246'. Such sleeve has a flange 247', a portion of which is cut away at 248' to make room for the mandrel carrying block 54, and a positioning member 249 (Figure 1) of generally horseshoe shape is also provided, as at Station IV, such positioning member being of the same type and cooperating with the mandrel and block in the same manner as the positioning member 166 shown in Figure 5.

The hollow shaft 241' fixedly carries a barrel cam 250 provided with a cam groove 251, for a purpose to be presently described. The rotatable sleeve 246' is offset at 252 to pass freely around the barrel cam 250 and has connected therewith through bolts 253 an upper bearing portion 254. The upper bearing portion 254 carries bearings 255 and 256 in which is rotatably mounted a spindle 257 which extends axially within the hollow shaft 241' and is also journaled in a bearing 258 at the lower extremity of such hollow shaft. The spindle 257 carries at its bottom the bevel gear 42 meshing with the bevel gear 41 carried by the shaft 40.

The upper bearing portion of the sleeve 246' carries eccentrically thereof a bearing 259 in which is rotatably mounted a hub 260 carrying a spur gear 261. The spur gear 261 meshes with a spur pinion 262 keyed to the spindle 257. The upper bearing portion 254 of the sleeve 246' has an upward and lateral extension 263 in which is splined for vertical sliding movement, but not for rotation with respect to the extension 263, a rod 264 which is provided at its lower portion with a hollow bore 265. Positioned within the bore 265 at the lower portion of the rod 264 is a compression spring 266 bearing between the top of the bore 265 and the top of a smaller rod 267 splined for vertical sliding movement within the rod 264 and carrying a laterally projecting pin 268 extending into an axial slot in the wall of the rod 264 for limiting the downward movement of the smaller rod 267 with respect to the rod 264 under the action of the compression spring 266. Threaded to the lower extremity of the rod 267 at 269 is a combination holddown and stripper 270, for a purpose to be presently described.

Mounted for vertical sliding movement within a portion 271 of the sleeve 246' is a collar 272 with which is connected a cam follower 273 operating within the groove 251 of the barrel cam 250. The collar 272 carries upper and lower bearings 274 and 275, respectively, in which is journaled for rotation a sleeve 276 which surrounds the rod 264 and has rotatable bearing therewith at 277. A collar 278 is threaded to the sleeve 276 and serves as a step bearing to prevent the sleeve from sliding downwardly within the collar 272. Likewise a collar 279 is threaded to the rod 264 to prevent such rod from moving downwardly with respect to the sleeve 276.

Figure 18:
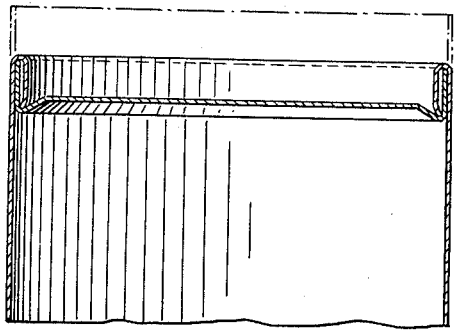

Threaded to the sleeve 276 at 280 is a hub 281 between which and the hollow lower extremity of the rod 264 is disposed a bearing 282. Connected with the hub 281 through a spacer 283 is a die carrier 284 having a downwardly extending neck 285 merging in a spinning die 286. The die 286 has a concave face 287 effective for spinning inwardly and downwardly the extremity of the body blank extending above the flange of the inner closure member. The spinning die also at the same time forms an annular depression in the inner closure member, so that the blank as it emerges from Station V is as shown in Figure 18. The spinning operation is carried on while the mandrel carrying the body blank and the inner closure member moves concentrically about the axis of the tool support. The spinning die 286 continuously revolves about its own axis as it is moved bodily about the axis of the spindle 257.

Normally the parts are in the position shown in Figure 7 at the time when the mandrel enters the station. The axis of the mandrel when moving through the station coincides with the axis of the spinning tool. As the mandrel moves in its path about the axis of the spindle 257, the stationary barrel cam 250 causes, through the cam follower 273, downward movement of the collar 272 and with it the sleeve 276 and the rod 264. The member 270 first engages the top of the inner closure member and presses it against the head of the mandrel while the spinning die 286 is moving into operative engagement with the upper extremity of the body blank, the compression spring 266 being effective for holding the member 270 against the inner closure member. The rotating spinning die moves downwardly into engagement with the upwardly extending extremity of the body blank, spinning it inwardly and downwardly, as above explained, and at the same time forcing the inner closure member down over the beveled upper edge of the mandrel to form the annular depression therein and tucking the extremity of the wall of the body blank into such annular depression. As the blank leaves Station V the inturned body wall extremity is merely positioned loosely, as shown in Figure 18, not being compressed against the flanged inner closure member.

*The expanding and compressing station—Station VI—Figure 8*

From Station V the blank in the condition shown in Figure 18 moves to Station VI at which the machine top 78 is provided with downwardly and inwardly extending flange portions 288 to which is connected by bolts 289 through a pad 290 a stationary sleeve 291. Fixedly mounted within the sleeve 291 is a vertically extending spindle 292 which does not rotate but which serves to support and guide the rotating parts. Rotatably mounted upon the upper portion of the sleeve 291 through suitable ball bearing means 293 is a sprocket 294. Connected with the sprocket 294 and extending downwardly therefrom about the ball bearing means 293 is an annular positioning device 295 which assists in centering the sprocket 294 with respect to the axis of the sleeve 291 and spindle 292. The sprocket chain 18 carrying the mandrels 68 meshes and cooperates with the sprocket 294 in the same manner as at the previous stations. Lying above and bolted to the sprocket 294 by bolts 296 is a sleeve 297. Such sleeve has a flange 298, a portion of which is cut away at 299 to make room for the mandrel carrying blocks 54, and a positioning member 300 of general horseshoe shape is also provided, as at previous stations.

The spindle 292 fixedly carries a barrel cam 301 provided with two cam grooves 302 and 303, respectively, for a purpose to be presently described. The rotatable sleeve 297 is offset at 304 to pass freely around the barrel cam 301 and has connected therewith through bolts 305 an upper bearing portion 306. The upper extremity of the stationary spindle 292 passes within a bearing hub 307 of the upper bearing portion 306 of the rotatable sleeve 297. Such bearing portion 306 also has a bearing hub 308 in which is mounted for vertical sliding movement an inner sleeve 309. Such sleeve carries a cam follower 310 operating in the cam groove 302 of the barrel cam 301. The inner sleeve 309 also is mounted for vertical sliding movement within an outer sleeve 311 carrying a cam follower 312 operating in the cam groove 303 of the barrel cam 301.

A solid rod 313 passes through the inner sleeve 309 and has threaded to it at its lower extremity a pivot member 314 to which are pivoted at 315 a pair of links 316, for a purpose to be presently described. The outer sleeve 311 has outwardly and downwardly extending arms 317 carrying horizontal pivot pins 318 upon each of which is pivotally mounted an outer resistance element 319 having an operating face 320 and an upwardly and inwardly extending arm 321 carrying a cam following roller 322. At its lower extremity the outer sleeve 311 carries radially slidable expanding blocks 323 to each of which is pivoted at 324 one of the links 316. The inner sleeve 309 is provided with a hub 325 having at its lower portion an annular cam face 326 for cooperation with the cam rollers 322, as shown in Figure 8. Surrounding the upper extremity of the rod 313 is a coil spring 327 biased between the upper extremity of the inner sleeve 309 and a washer 328 bearing against a nut 329 threaded on the rod 313 and held in place by a lock nut 330.

The outer resistance elements 319 are segmentally formed, their respective operating faces 320 being adapted to lie snugly against the outside of the upper extremity of the body blank 88 to resist outward pressure created by the expanding blocks 323, which are also shaped to conform to the inner periphery of the top of the blank. As the mandrel carrying the body blank and flanged inner closure member in the condition as shown in Figure 18, passes through Station VI, the respective barrel cam grooves 302 and 303 are effective for moving downwardly the respective inner and outer sleeves 309 and 311, such sleeves at first moving substantially together until the bottom faces of the expanding blocks 323 engage with the upper face of the flanged inner closure member and the operating faces 320 of the resistance elements 319 reach substantially the same horizontal plane as the upper portion of the blank, whereupon the outer sleeve 311 stops and the inner sleeve 309 continues its downward movement to move the expanding blocks 323 radially outwardly against the inner surface of the inturned wall extremity, acting through the links 316, and at the same time, through the cam face 326 and cam rollers 322, to press the resistance elements 319 against the outer surface of the blank, whereby to press together the body blank and the flanged inner closure member, as shown in Figure 19. A bead is formed at the extremity of the inturned wall portion of the body blank, such bead lying substantially entirely within the annular depression in the inner closure member and assisting in positioning the outer closure disc, as will be presently described. After the expanding operation has been performed, the inner sleeve 309 first moves upwardly to withdraw the expanding blocks 323 and resistance elements 319 preparatory to the succeeding cycle of operations. The coil spring 327 is effective for moving the rod 313 upwardly with the inner sleeve 309, however lending some resiliency to the latter, so as to permit it to lag slightly upon the upward movement so as not to damage the blank.

*The means for feeding, positioning and applying the outer closure disc—Station VII—Figure 9*

From Station VI the blank, as shown in Figure 19, passes to Station VII where the outer closure disc is inserted. The mechanism of Station VII is mounted on a frame extension 331' provided with sockets 332' adapted to slidably receive pins 333' carried by the main frame of the machine at 334'. The extension 331' carries set screws 335' bearing against the main frame for spacing the extension a desired distance from the main frame, this provision being made for the purpose of enabling taking up of slack in the driving chain 18 caused by wear. The apparatus for inserting the disc is substantially identical with that at Station IV used for inserting the inner flanged closure member, clearly shown in Figures 5, 6 and 6a and fully described above, except that the female flanging die 185 is not used inasmuch as the outer closure disc is a flat, and not a flanged, member. It is therefore unnecessary to again describe the supporting structure.

There is provided a table 331 on which are positioned upright posts 332 and 333, the lower extremity of the latter being spaced above the table top a distance slightly greater than the thickness of one of the outer closure discs. The outer closure discs are previously cut from material somewhat thicker than the material of which the flanged inner closure members are made, and are piled on the table 331 between the posts 332 and 333. Positioned for horizontal reciprocatory movement within a groove in the table is a rack 334 actuated by a pinion 335 rotated alternately in opposite directions by any suitable mechanism, such, for example, as that shown in Figure 5.

The upper surface 334' of the rack 334 is spaced from the top of the table 331 a distance somewhat less than the thickness of one of the outer closure discs so that upon reciprocatory movement of the rack it pushes one of the discs out from the bottom of the pile, such disc moving toward the left, viewing Figure 9, and being advanced by a pair of feed rolls 336 driven by a sprocket chain 337 meshing with a sprocket 338 on a shaft 339 mounted in the frame. Also meshing with a similar sprocket on the shaft 339 is a sprocket chain 340 driven by the sprocket 33 on the shaft 32.

The top roller 336 may, if desired, emboss or print suitable matter upon the upper face of each disc as it passes thereunder. The disc feeding mechanism generally described above is preferably substantially identical with that disclosed in United States Patent No. 1,790,910, granted February 3, 1931, on an invention of James E. Annen and myself. Inasmuch as such mechanism forms no part of the present invention and is fully disclosed in said patent, it will not be here described in detail.

The discs are moved forward from the rolls 336 onto a positioning table 341 having grooves 342 exactly analogous to the positioning table 212, shown in Figures 5, 6 and 6a. The tool is provided with positioning pins 343 like the pins 199 shown in Figures 5 and 6, and also has a disc seating die 344 provided with an annular die face 345 and carrying substantially axially thereof a suction device 346. Surrounding the die 344 is an annular holddown member 347 serving to prevent the blank from following the die upwardly after the outer closure disc has been inserted. In general, the operation of this device is substantially the same as that of the device of Figures 5 and 6, the disc, having previously been properly centered with respect to the die by the pins 343, being held in place on the die 344 by the suction device 346 and such die then moving downwardly to force the disc into the top of the body blank against the flanged closure member and so that its periphery lies above and in contact with the bead previously formed at the extremity of the inturned wall of the body blank, the blank appearing as in Figure 20 as it leaves Station VII.

*The second spinning station—Station VIII*

As above mentioned, the second spinning Station VIII is substantially identical with the first spinning Station V shown in Figures 7 and 7a, except for the contour of the spinning tool. Therefore, no detail view of the second spinning station is necessary. At such station the wall portion extending above the outer closure disc is spun inwardly and compressed so as to produce the finished closure structure shown in Figure 21. An outer bead is formed which lies against the outer periphery of the outer closure disc, assisting in holding such disc against the inner bead formed at the extremity of the inturned wall portion and also against the face of the flanged inner closure member. Thus an exceptionally strong and tight closure is formed.

*The means for removing the finished container from the mandrel—Station IX—Figure 10*

As the container leaves Station VIII it is finished and the only operation remaining to be performed is the removal of the finished container from the mandrel. This is accomplished at Station IX, which is of the same rotary type as preceding stations.

At Station IX there is provided a bearing sleeve 348 having rotatably mounted thereon a sprocket 349, the general mounting and bearing structure being substantially the same as at previous stations. Bolted to the sprocket 349 at 350 is a downwardly extending sleeve 351 having a flange 352 through which the bolts 350 pass. Connected with the bearing sleeve 348 at its lower extremity is a housing 353 with which cooperates a bearing 354 connected with the sleeve 351 at 355'. The sleeve 351 rotates with the sprocket 349 and has no vertical movement.

Splined within the sleeve 351 is a spindle 355 to the lower portion of which is connected to rotate therewith a barrel cam 356 having a cam groove 357. A collar 358 also surrounds the lower extremity of the spindle 355 and has bearing within a hub 359 of the housing 353. The collar 358 and barrel cam 356 are maintained in place on the spindle 355 by a nut 360. Fixedly connected with the housing 353 is a cam follower 361 adapted to operate in the cam groove 357 of the barrel cam 356.

Also bolted to the sprocket 349 by the bolts 350 is a valve device 362 having an annular passage 362' extending axially of the spindle 355, such passage communicating with a radial outlet passage 363, for a purpose to be presently described. Mounted on a frame member 364 and surrounding the upper portion of the valve device 362 is a collar 365 having a radial inlet passage 366 communicating with a source of fluid pressure 367, the collar 365 being packed to the valve device 362 at 368 and 369, respectively. The valve device 362 is so formed that during only a portion of the rotation of the spindle 355 is the annular passage 362' in communication with the inlet passage 366 in the collar 365.

The upper portion of the spindle 355 is enlarged at 370 and has an axial bore 371 communicating with a radial port 372. The upper end of the axial bore 371 is plugged at 373. Also carried by the frame member 364 is a collar 374 having a radial inlet passage 375 in communication with a suction conduit 376 extending to a vacuum pump (not shown). The port 372 is so formed that during only a portion of the rotation of the spindle 355 is the suction conduit 376 in communication with the bore 371 of the spindle. There is also in the upper portion 370 of the spindle 355 a radial outlet passage 377 communicating with a chamber 378 in an arm 379 fixedly connected with the spindle at 380. The arm 379 has a longitudinal bore 381 plugged at its outer extremity at 382 and communicating with the chamber 378. The bottom of the arm 379 is smooth and flat, and a passage 383 leads from the lower surface of the arm into communication with the bore 381.

The construction of the mandrel 68 and the mandrel carrying block 54 and the connections between the same and between the block and the sprocket chain 18, shown in Figure 10, have been previously described in connection with the showing of Figures 11 to 15, inclusive.

In the operation of Station IX the respective mandrel carrying blocks 54 move successively into cooperative relationship with a flexible seat 384 on the valve device 362 so that the passage 61 in the block 54 lies in direct communication with the passage 363 in the valve device 362. This cooperative relationship is maintained during the movement of the mandrel through its circular path in Station IX.

As the mandrel enters Station IX, the arm 379 is in lowered position, as shown in dotted lines at 385, so that the distance between its lower surface and the upper surface of the mandrel is less than the height of the container. Substantially simultaneously air pressure is delivered to the pipe 65 in the mandrel, and the passage 383 in the bottom of the arm 379 is brought into communication with the suction conduit 376 so that the container is blown upwardly with respect to the mandrel 68 by the air pressure within the pipe 65 and against the flat lower surface of the arm 379. At the same time the suction in the passage 383 holds the container against the under surface of the arm 379, and the barrel cam 356 is then effective for raising the spindle 355, and consequently the arm 379, so that the container will clear the mandrel. The arm 379 is shown in full lines in Figure 10 in its uppermost position carrying the finished container clear of the top of the mandrel. The arm 379 then rotates to a position 386, shown in chain lines in Figure 10, at which the suction is relieved and the finished container deposited upon a suitable shelf or conveyor 387. The finished container is then removed from the machine and the arm 379 continues its rotation and is lowered to the dotted line position 385 for the subsequent cycle. The respective empty mandrels then successively pass around the sprocket 17 and back to Station II at which body blanks supplied by Station I are deposited on them, as above described. Thus the machine as a whole works continuously in cycles, and each operating station also individually works continuously in cycles, the cycles of the respective operating stations being coordinated to successively perform the desired mechanical operations upon the blank as it passes through the machine.

While I have shown and described a present preferred embodiment of the invention, it is to be distinctly understood that the same is not limited thereto, but may be otherwise variously embodied and practiced within the scope of the following claims.

I claim:

1. A method of making fibrous containers, comprising advancing a blank of fibrous material along a predetermined path which includes an arcuate portion, said arcuate portion being less than 360° in extent, and operating upon the blank to deform said fibrous material by a tool which traverses said portion at the same angular speed as the blank.

2. A method of making fibrous containers, comprising advancing a blank of fibrous material positioned over a mandrel along a predetermined path having portions at intervals disposed substantially as circle arcs, having different centers and operating upon the blank at each of such portions of the path by a tool cooperating with the mandrel and traversing the path at the same angular speed as the blank.

3. A method of making fibrous containers, comprising supporting a blank of fibrous material in upright position over a mandrel, substantially continuously moving the blank while so supported through a plurality of operating stations, causing the blank to bodily traverse a path disposed substantially as a circle arc while moving through each such station, said circle arcs being of different circles, and simultaneously operating on the blank by a tool cooperating with the mandrel and moving therewith in each such path.

4. A method of making containers, comprising bodily moving a blank supporting member having a blank thereon along a path disposed substantially as a circle arc, bringing an operating tool into engagement with the blank while so moving it, and causing the blank supporting member to engage and bodily move with it the operating tool along such path.

5. Apparatus for making containers, comprising an endless carrier, mandrels mounted thereon at intervals, means for guiding the carrier at spaced portions of its path substantially along circle arcs, and an operating tool pivoted substantially at the center of each of such arcs for operating on a blank carried by one of said mandrels.

6. Apparatus for making containers, comprising an operating tool pivoted for bodily swinging movement, a sprocket connected with the tool, a sprocket chain engaging the sprocket, and a mandrel connected with the chain for supporting a blank whereby upon movement of the chain the tool and blank are brought into cooperative relationship during the bodily swinging movement of the tool.

7. Apparatus for making containers, comprising a movable endless element, means for guiding aid element in a path disposed substantially as a circle arc, a tool pivoted at the center of such path, means connected with the tool and adapted to engage said element whereby the tool and element move at the same angular speed, a mandrel carried by the endless element for supporting a blank, and means for bringing the tool into cooperative relationship with a blank on said mandrel during movement of said element in said path.

8. A machine of the type embodying an endless work carrier, comprising an endless sprocket chain, mandrel means thereon, means for driving the chain, a plurality of operating stations, each of such stations having a sprocket meshing with the chain and around a portion of the periphery of which the chain passes, each of such stations also having an operating tool connected with the sprocket and bodily swingable thereby in cooperative relation with work carried by the mandrel means, and means for operating the respective tools, whereby to perform a sequence of operations upon the work.

9. Apparatus for making containers, comprising an endless sprocket chain, blank carrying mandrel means thereon, a plurality of operating stations each having a sprocket with which the sprocket chain is adapted to mesh, the sprocket chain engaging the sprocket through an arc of approximately 180° at at least some of such stations, and means at each of such stations for operating upon a blank carried by the blank carrying mandrel means as such blank traverses the arc of engagement between the sprocket chain and sprocket thereat.

10. Apparatus for making containers, comprising a flexible carrying member, mandrel means for supporting a blank on the carrying member to be carried thereby, a plurality of operating stations each having a generally circular operating member cooperating with the carrying member, the carrying member engaging the operating member through an arc of approximately 180° at at least some of such stations, and means at each of such stations for operating upon a blank carried by the mandrel means as such blank traverses the arc of engagement between the carrying member and the operating member thereat.

11. Mechanism of the class described, comprising a movable carrier having spaced blank advancing means thereon, an operating station about which said carrier is adapted to move in an arcuate path, the blank advancing means on the carrier being spaced apart longitudinally of the carrier a distance substantially equal to the circumference of a circle having the same radius as said arcuate path, and means at said operating station for operating on blanks advanced by said blank advancing means during movement in said arcuate path.

12. Mechanism of the class described, comprising a movable carrier having spaced blank advancing means thereon, an operating station about which said carrier is adapted to move in an arcuate path, a single positioning device rotatably disposed at said operating station and adapted to cooperate successively with said blank advancing means to insure proper positioning of blanks advanced thereby during movement in said arcuate path, said blank advancing means being spaced apart longitudinally of the carrier a distance substantially equal to the circumference of a circle having the same radius as said arcuate path so that each of said blank advancing means cooperates with said positioning device, and means at said operating station for operating on said blanks.

13. Mechanism of the class described, comprising a movable carrier having spaced blank advancing means thereon, an operating station about which said carrier is adapted to move in an arcuate path, a generally horse-shoe shaped positioning device rotatably disposed at said operating station and the opposite extremities of which are adapted to cooperate successively with said blank advancing means to insure proper positioning of blanks advanced thereby during movement in said arcuate path, and means at said operating station for operating on said blanks.

14. An apparatus for making fibrous containers comprising an upright mandrel bodily movable through a work station in a circular arc, the mandrel being provided with means for supporting a container in fitting engagement therewith with its end projecting above the mandrel, a tool for operating on the projecting end of said container while traveling in said arc, said tool being mounted to travel in an arc corresponding to the arc of the mandrel and for vertical movement while so traveling to engage the work, and means for automatically operating the tool synchronized with the movement of the mandrel.

GEORGE O. FROSTAD.